(12) United States Patent
Rubinstein et al.

(10) Patent No.: US 10,129,658 B2
(45) Date of Patent: Nov. 13, 2018

(54) METHOD AND APPARATUS FOR RECOVERING AUDIO SIGNALS FROM IMAGES

(71) Applicant: Massachusetts Institute of Technology, Cambridge, MA (US)

(72) Inventors: Michael Rubinstein, Somerville, MA (US); Myers Abraham Davis, Cambridge, MA (US); Frederic Durand, Somerville, MA (US); William T. Freeman, Acton, MA (US); Neal Wadhwa, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 145 days.

(21) Appl. No.: 14/337,091

(22) Filed: Jul. 21, 2014

(65) Prior Publication Data
US 2015/0319540 A1    Nov. 5, 2015

Related U.S. Application Data

(60) Provisional application No. 61/856,919, filed on Jul. 22, 2013.

(51) Int. Cl.
    *H04R 23/00*    (2006.01)
    *G01H 9/00*     (2006.01)
    *H04R 3/00*     (2006.01)

(52) U.S. Cl.
    CPC ............ *H04R 23/008* (2013.01); *G01H 9/00* (2013.01); *G01H 9/002* (2013.01); *H04R 3/00* (2013.01)

(58) Field of Classification Search
    CPC ............ H04R 2201/405; H04R 3/005; H04R 23/008; H04R 3/00; A61B 6/466;
    (Continued)

(56) References Cited

U.S. PATENT DOCUMENTS 7,532,541 B2 * 5/2009 Govindswamy ........ G01S 15/89
                                                        367/11
8,027,513 B2   9/2011 Leichter et al.
               (Continued)

FOREIGN PATENT DOCUMENTS

WO    WO 2016/145406 A1    9/2016

OTHER PUBLICATIONS

Oxford English Dictionary entry for "optical," retrieved Nov. 21, 2016.*

(Continued)

*Primary Examiner* — Andrew C Flanders
(74) *Attorney, Agent, or Firm* — Hamilton, Brook, Smith & Reynolds, P.C.

(57) ABSTRACT

A method of recovering audio signals and corresponding apparatus according to an embodiment of the present invention using video or other sequence of images enables recovery of sound that causes vibrations of a surface. An embodiment method includes combining representations of local motions of a surface to produce a global motion signal of the surface. The local motions are captured in a series of images of features of the surface, and the global motion signal represents a sound within an environment in which the surface is located. Some embodiments compare representations of local motions of a surface to determine which motions are in-phase or out-of-phase with each other, enabling visualization of surface vibrational modes. Embodiments are passive, as compared to other forms of remote audio recovery that employ active sensing, such as laser microphone systems. Example applications for the embodiments include espionage and surveillance.

39 Claims, 23 Drawing Sheets
(14 of 23 Drawing Sheet(s) Filed in Color)

(58) Field of Classification Search
CPC .... A61B 8/4472; A61B 8/483; G01N 29/265; G01S 15/00; G01S 15/003; G01S 15/02; A61L 36/466; G01H 9/00; G01H 9/002
See application file for complete search history.

(56) References Cited

U.S. PATENT DOCUMENTS

| | | | |
|---|---|---|---|
| 8,251,909 B2* | 8/2012 | Arnold | A61B 5/0095 600/459 |
| 9,172,913 B1 | 10/2015 | Johnston | |
| 9,324,005 B2 | 4/2016 | Wadhwa et al. | |
| 9,811,907 B2 | 11/2017 | Wu et al. | |
| 2008/0135762 A1* | 6/2008 | Villanucci | G01H 9/00 250/340 |
| 2008/0151694 A1* | 6/2008 | Slater | G01H 9/00 367/178 |
| 2009/0095086 A1* | 4/2009 | Kessler | G01N 29/069 73/606 |
| 2009/0322778 A1* | 12/2009 | Dumitras | G06T 11/001 345/582 |
| 2011/0222372 A1* | 9/2011 | O'Donovan | G01S 3/8083 367/103 |
| 2011/0254842 A1* | 10/2011 | Dmitrieva | A61B 8/469 345/424 |
| 2012/0020480 A1* | 1/2012 | Visser | H04R 3/12 381/17 |
| 2012/0027217 A1* | 2/2012 | Jun | H04S 7/30 381/58 |
| 2013/0121546 A1 | 5/2013 | Guissin | |
| 2013/0147835 A1* | 6/2013 | Lee | H04R 3/005 345/629 |
| 2013/0272095 A1* | 10/2013 | Brown | G01S 3/801 367/118 |
| 2013/0301383 A1* | 11/2013 | Sapozhnikov | G03H 3/00 367/8 |
| 2013/0329953 A1 | 12/2013 | Schreier | |
| 2014/0072190 A1 | 3/2014 | Wu et al. | |
| 2014/0072228 A1 | 3/2014 | Rubinstein et al. | |
| 2014/0072229 A1 | 3/2014 | Wadhwa et al. | |
| 2015/0016690 A1 | 1/2015 | Freeman et al. | |
| 2016/0217587 A1 | 7/2016 | Hay | |
| 2016/0267664 A1 | 9/2016 | Davis et al. | |
| 2017/0109894 A1 | 4/2017 | Uphoff | |
| 2017/0221216 A1 | 8/2017 | Chen et al. | |
| 2018/0061063 A1 | 3/2018 | Chen et al. | |

OTHER PUBLICATIONS

Ait-Aider, O., et al., "Kinematics from Lines in a Single Rolling Shutter Image," Proceedings of CVPR '07.
Boll, S.F., "Suppression of Acoustic Noise in Speech Using Spectral Subtraction," IEEE Trans. Acous. Speech Sig. Proc., ASSP-27(2): 113-120 (1979).
Chen., J.G., et al., Chapter 19 Structural Modal Identification Through High Speed Camera Video: Motion Magnification, Modal Analysis I, 7: 191-197 (2014).
de Cheveigne, A., "YIN, A Fundamental Frequency Estimator for Speech and Music[a]," J. Acoust. Soc. Am., 111(4): 1917-1930 (2002).
Garofolo, J.S., et al., "DARPA TIMIT Acoustic-Phonetic Continuous Speech Corpus CD-ROM," NIST Speech Disc 1-1.1 (1993).
Gautama, T., and Van Hulle, M. M., "A Phase-Based Approach to the Estimation of the Optical Flow Field Using Spatial Filtering," IEEE Trans. Neur. Net., 13(5): 1127-1136 (2002).
Geyer, C., et al. "Geometric Models of Rolling-Shutter Cameras," EECS Department, University of California, Berkeley, 1-8.
Grundmann, M., et al., "Calibration-Free Rolling Shutter Removal," http://www.ee.gatech.edu/cpl/projects/rollingshutter, 1-8.
Hansen, J.H.L. and Pellom, B.L., "An Effective Quality Evaluation Protocol for Speech Enhancement Algorithms," Robust Speech Processing Laboratory, http://www.ee.duke.edu/Research/Speech.

Janssen, A.J.E.M., et al., "Adaptive Interpolation of Discrete-Time Signals That Can be Modeled as Autoregressive Processes," IEEE Trans. Acous. Speech, Sig. Proc., ASSP-34(2): 317-330 (1986).
Jansson, E., et al. "Resonances of a Violin Body Studied," Physica Scripta, 2: 243-256 (1970).
Liu, C., et al., "Motion Magnification."
Loizou, P.C., Speech Enhancement Based on Perceptually Motivated Bayesian Estimators of the Magnitude Spectrum, IEEE Trans. Speech Aud. Proc., 13(5): 857-869 (2005).
Morlier, J., et al., "New Image Processing Tools for Structural Dynamic Monitoring."
Nakamura, J., "Image Sensors and Signal Processing for Digital Still Cameras," (2006).
Portilla, J. and Simoncelli, E. P., "A Parametric Texture Model Based on Joint Statistics of Complex Wavelet Coefficients," Int'l. J. Comp. Vis., 40(1): 49-71 (2000).
Powell, R.L. and Stetson, K.A., "Interferometric Vibration Analysis by Wavefront Reconstruction," J. Opt. Soc. Amer., 55(12): 1593-1598 (1965).
Rothberg, S.J., et al., "Laser Vibrometry: Pseudo-Vibrations," J. Sound Vib., 135(3): 516-522 (1989).
Rubinstein, M., "Analysis and Visualization of Temporal Variations in Video," (2014).
Simoncelli, E.P., et al., "Shiftable Multiscale Transforms," IEEE Trans. Info. Theory, 38(2): 587-607 (1992).
Stanbridge, A.B. and Ewins, D.J., "Modal Testing Using a Scanning Laser Doppler Vibrometer," Mech. Sys. Sig. Proc., 13(2): 255-270 (1999).
Taal, C.H., et al.,"An Algorithm for Intelligibility Prediction of Time-Frequency Weighted Noisy Speech," IEEE Trans. Aud. Speech, Lang. Proc., 19(7): 2125-2136 (2011).
Wadhwa, N., et al., "Phase-Based Video Motion Processing."
Wadhwa, N., et al., "Riesz Pyramids for Fast Phase-Based Video Magnification," http://people.csail.mit.edu/nwadhwa/ricsz-pyramid, 49-71.
Wu, H-Y., et al., "Eulerian Video Magnification for Revealing Subtle Changes in the World."
Zalevsky, Z., et al., "Simultaneous Remote Extraction of Multiple Speech Sources and Heart Beats from Secondary Speckles Pattern," Optic Exp., 17(24): 21566-21580 (2009).
Avitabile, P., "Modal space: Back to basics," *Experimental techniques*, 26(3):17-18 (2002).
Bathe, K.J., "*Finite Element Procedures*" Publisher Klaus-Jurgen Bathe, 2006.
Brincker, R. , et al., "Why output-only modal testing is a desirable tool for a wide range of practical applications," *Proc. of the International Modal Analysis Conference (IMAC) XXI*, Paper vol. 265. (2003).
Chen, J.G., et al., "Near Real-Time Video Camera Identification of Operational Mode Shapes and Frequencies," 1-8 (2015).
Chen, J.G., et al., "Modal Identification of Simple Structures with High-Speed Video Using Motion Magnification," Journal of Sound and Vibration, 345:58-71 (2015).
Chuang, Y.-Y., et al., "Animating pictures with Stochastic Motion Textures," *ACM Trans. on Graphics—Proceedings of ACM Siggraph*, 24(3):853-860 (Jul. 2005).
Davis, A., et al., "Visual Vibrometry: Estimating Material Properties from Small Motion in Video," *The IEEE Conference on Computer Vision and Pattern Recognition* (CVPR), 2015.
Davis, A., et al., "The Visual Microphone: Passive Recovery of Sound From Video," *MIT CSAIL* pp. 1-10 (2014); ACM Transactions on Graphics (Proc. SIGGRAPH) 33, 4, 79:1-79:10 (2014).
Davis, A., et al., "Image-Space Modal Bases for Plausible Manipulation of Objects in Video," *ACM Transactions on Graphics*, vol. 34, No. 6, Article 239, (Nov. 2015).
DeRoeck, G., et al., "Benchmark study on system identification through ambient vibration measurements," *In Proceedings of IMAC-XVIII, The 18th International Modal Analysis Conference*, San Antonio, Texas, pp. 1106-1112 (2000).
Doretto, G., et al., "Dynamic textures," *International Journal of Computer Vision*, 51(2):91-109 (2003).

(56) References Cited

OTHER PUBLICATIONS

Fleet, D.J. and Jepson, A.D., "Computation of Component Image Velocity From Local Phase Information," *International Journal of Computer Vision* 5(1):77-104 (1990).
Freeman, W.T. and Adelson, E.H., "The Design and Use of Steerable Filters," *IEEE Transactions on Pattern Analysis and Machine Intelligence* 13(9):891-906 (1991).
Helfrick, M.N., et al., "3D Digital Image Correlation Methods for Full-field Vibration Measurement," *Mechanical Systems and Signal Processing*, 25:917-927 (2011).
Hermans, L. and Van Der Auweraer, H., "Modal Testing and Analysis of Structures Under Operational Conditions: Industrial Applications," *Mechanical and Systems and Signal Processing* 13(2):193-216 (1999).
Horn, B.K.P. and Schunck, B.G., "Determining Optical Flow," *Artificial Intelligence*, 17(1-3), 185-203 (1981).
Huang, J., et al., "Interactive shape interpolation through controllable dynamic deformation," *Visualization and Computer Graphics, IEEE Transactions* on 17(7):983-992 (2011).
James, D.L., and Pai, D.K., "Dyrt: Dynamic Response Textures for Real Time Deformation simulation with Graphics Hardware," *ACM Transactions on Graphics (TOG)*, 21(3):582-585 (2002).
James, D.L, and Pai, D.K., "Multiresolution green's function methods for interactive simulation of large-scale elastostagic objects," *ACM Transactions on Graphics (TOG)* 22(I):47-82 (2003).
Kim, S.-W. and Kim, N.-S., "Multi-Point Displacement Response Measurement of Civil Infrastructures Using Digital Image Processing," *Procedia Engineering* 14:195-203 (2011).
Langlois, T.R., et al., "Eigenmode compression for modal sound models," *ACM Transactions on Graphics (Proceedings of SIGGRAPH 2014)*, 33(4) (Aug. 2014).
Li, S., et al., "Space-time editing of elastic motion through material optimization and reduction," *ACM Transactions on Graphics*, 33(4), (2014).
Lucas, B. D. and Kanade, T., "An Iterative Image Registration Technique With an Application to Stereo Vision," *Proceedings of the 7th International Joint Conference on Artificial Intelligence*, pp. 674-679 (1981).
Pai, D.K., et al., "Scanning Physical Interaction Behavior of 3d Objects," *Proceedings of the 28$^{th}$ Annual Conference on Computer Graphics and Interactive Techniques*, ACM, New York, NY, USA, SIGGRAPH '01, pp. 87-96 (2001).
Park, J.-W., et al., "Vision-Based Displacement Measurement Method for High-Rise Building Structures Using Partitioning Approach," *NDT&E International* 43:642-647 (2010).
Patsias, S., et al., "Damage Detection using Optical Measurements and Wavelets," *Structural Health Monitoring* 1(1):5-22 (Jul. 2002).
Pentland, A. and Sclaroff, S., "Closed-form Solutions for Physically Based Shape Modeling and Recognition," *IEEE Transactions on Pattern Analysis and Machine Intelligence*, 13(7):715-729 (Jul. 1991).
Pentland, A., and Williams. J., "Good vibrations: Modal Dynamics for Graphics and Animation," *SIGGRAPH '89 Proceedings of the 16$^{th}$ Annual Conference on Computer Graphics and Interactive Techniques, ACM*. vol. 23, pp. 215-222 (1989).
Poh, M.Z., et al., "Non-Contact, Automated Cardiac Pulse Measurements Using Video Imaging and Blind Source Separation," *Optics Express*, 18(10): 10762-10774 (2010).
Poudel, U., et al., "Structural damage detection using digital video imaging technique and wavelet transformation," *Journal of Sound and Vibration* 286(4):869-895 (2005).
Schödl, A., et al., "Video Textures," *Proceedings of the 27$^{th}$ Annual Conference on Computer Graphics and Interactive Techniques*, ACM Press/Addison-Wesley Publishing Co., New York, NY, USA, SIGGRAPH '00, pp. 489-498 (2000).
Shabana, A.A. "*Theory of Vibration*," vol. 2., Springer (1991).
Stam, J., "Stochastic Dynamics: Simulating the effects of turbulence on flexible structures", *Computer Graphics Forum*, 16(3): C159-C164 (1996).
Sun, M., et al., "Video input driven animation (vida)," *Proceedings of the Ninth IEEE International Conference on Computer Vision—vol. 2*, IEEE Computer Society, Washington, DC, USA, 96, (2003).
Szummer, M., and Picard, R.W., "Temporal texture modeling," *IEEE Intl. Conf. Image Processing*, 3:823-836 (1996).
Tao, H., and Huang, T.S., "Connected vibrations: A modal analysis approach for non-rigid motion tracking," CVPR, *IEEE Computer Society*, pp. 735-740 (1998).
Van Den Doel, K., and Pai, D.K., "Synthesis of shape dependent sounds with physical modeling," *Proceedings of the International Conference on Auditory Display* (ICAD) (1996).
Zheng, C., and James, D.L., "Toward high-quality modal contact sound," *ACM Transactions on Graphics (TOG).*, vol. 30, ACM, 38 (2011).
Caetano, E., et al., "A Vision System for Vibration Monitoring of Civil Engineering Structures," *Experimental Techniques*, vol. 35; No. 4; 74-82 (2011).
Chen, J. G., et al., "Long Distance Video Camera Measurements of Structures," 10th International Workshop on Structural Health Monitoring (IWSHM 2015), Stanford, California, Sep. 1-3, 2015 (9 pages).
Chen, J. G., et al., "Developments with Motion Magnification for Structural Modal Identification," Dynamics of Civil Structures, vol. 2; 49-57 (2015).
Joshi, N., et al., "Image Deblurring using Inertial Measurement Sensors," ACM Transactions on Graphics, vol. 29; No. 4; 9 pages (2010).
Long, J. and Buyukozturk, O., "Automated Structural Damage Detection Using One-Class Machine Learning," Dynamics of Civil Structures, vol. 4; edited by Catbas, F. N., Conference Proceedings of the Society for Experimental Mechanics Series; 117-128; Springer International Publishing (2014).
Mohammadi Ghazi, R. and Buyukozturk, O., "Damage detection with small data set using energy-based nonlinear features," Structural Control and Health Monitoring, vol. 23; 333-348 (2016).
Park, S. H. and Levoy, M., "Gyro-Based Multi-Image Deconvolution for Removing Handshake Blur," Computer Vision and Pattern Recognition (CVPR), Columbus, Ohio; 8 pages (2014).
Smyth, A. and Meiliang, W., "Multi-rate Kalman filtering for the data fusion of displacement and acceleration response measurements in dynamic system monitoring," Mechanical Systems and Signal Processing, vol. 21; 706-723 (2007).
Sohn, H., et al., "Structural health monitoring using statistical pattern recognition techniques," Journal of Dynamic Systems, Measurement, and Control, vol. 123; No. 4; 706-711 (2001).
Vendroux, G and Knauss, W.G., "Submicron Deformation Field Measurements: Part 2. Improved Digital Image Correlation," Experimental Mechanics; vol. 38; No. 2; 86-92 (1998).
Alam, Shafaf, Surya PN Singh, and Udantha Abeyratne. "Considerations of handheld respiratory rate estimation via a stabilized Video Magnification approach." Engineering in Medicine and Biology Society (EMBC), 2017 39th Annual International Conference of the IEEE. IEEE, 2017.
Jobard, Bruno, Gordon Erlebacher, and M. Yousuff Hussaini. "Lagrangian-Eulerian advection of noise and dye textures for unsteady flow visualization." IEEE Transactions on Visualization and Computer Graphics 8.3 (2002): 211-222.
Nunez, Alfonso, et al. "A space-time model for reproducing rain field dynamics." (2007): 175-175.
Shi, Gong, and Gang Luo. "A Streaming Motion Magnification Core for Smart Image Sensors," IEEE Transactions on Circuits and Systems II: Express Briefs (2017).
Wang, Wenjin, Sander Stuijk, and Gerard De Haan. "Exploiting spatial redundancy of image sensor for motion robust rPPG." IEEE Transactions on Biomedical Engineering 62.2 (2015): 415-425.

\* cited by examiner

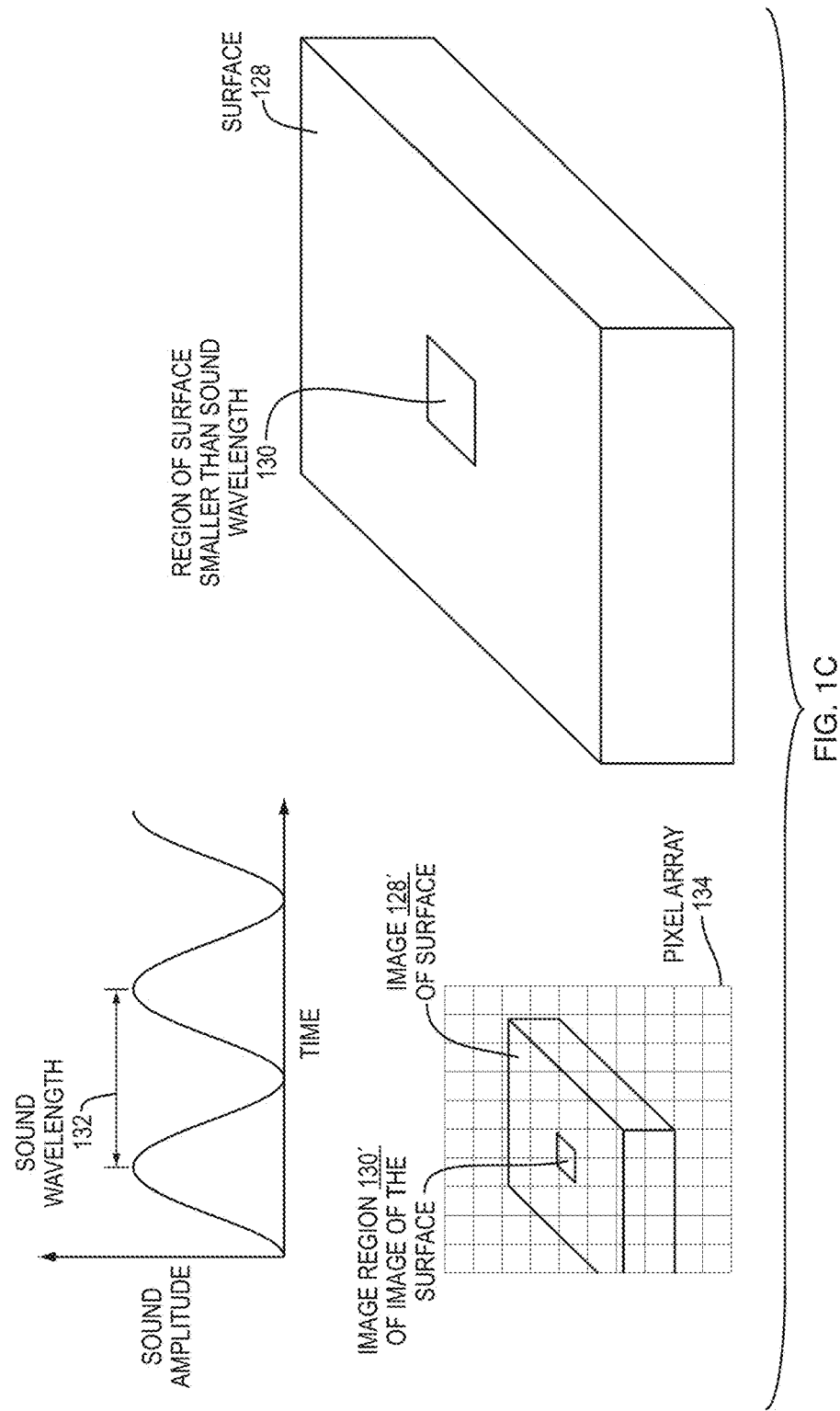

SETUP AND REPRESENTATIVE FRAME

RECOVERED SOUND

INPUT SOUND

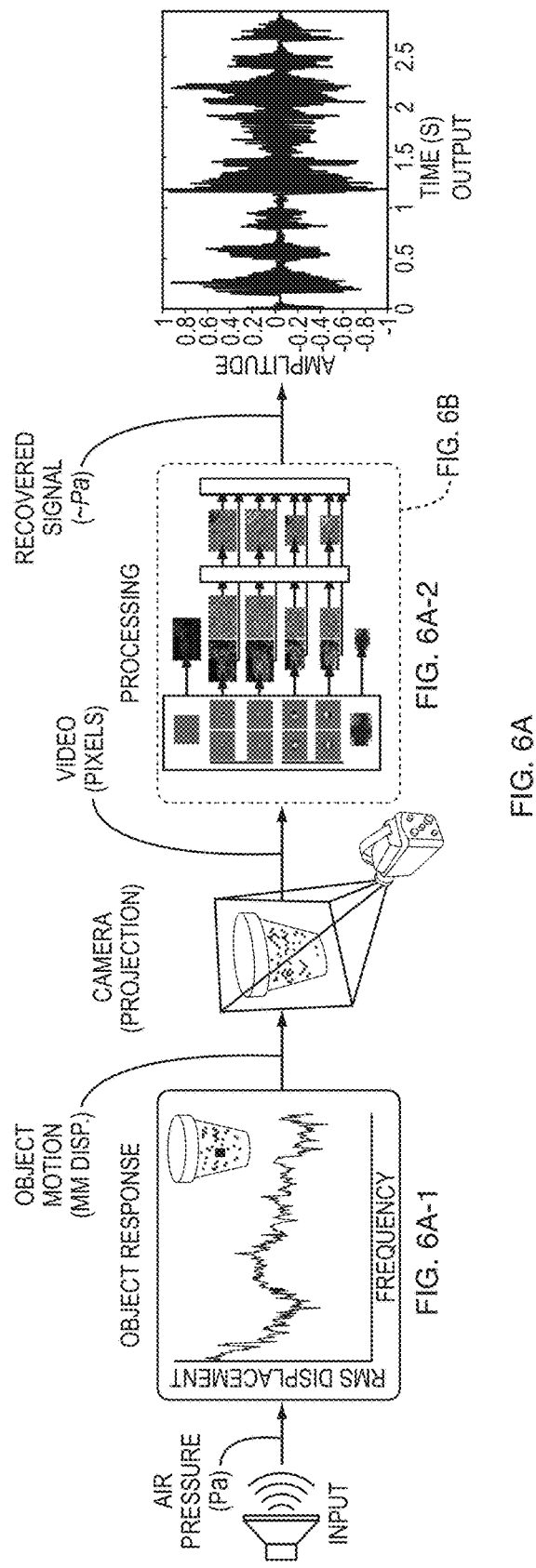

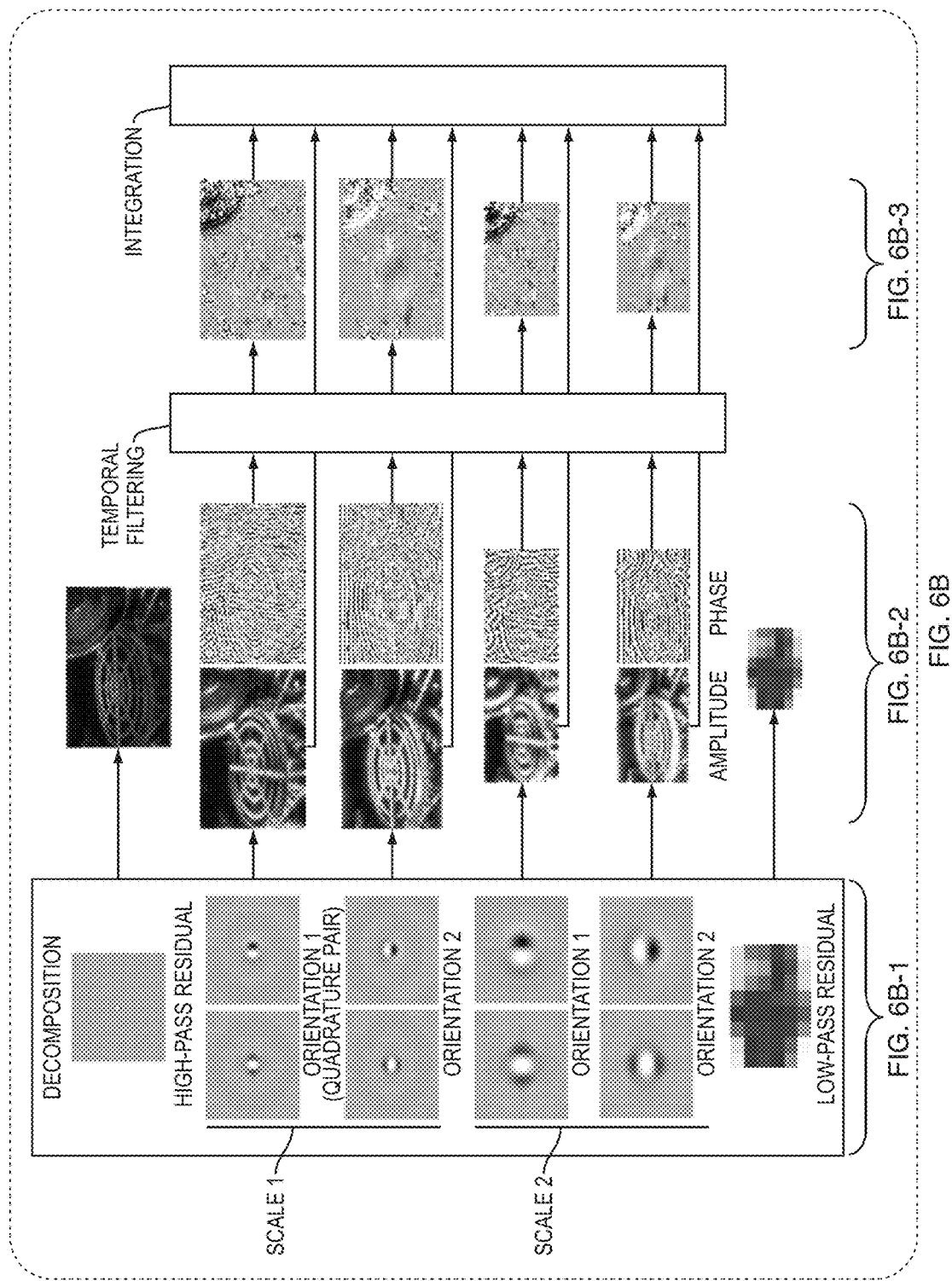

| SEQUENCE | METHOD | SSNR | LLR MEAN | INTELLIGIBILITY |
|---|---|---|---|---|
| FEMALE SPEAKER - fadg0, sa1 | VM | 24.5 | 1.47 | 0.72 |
| | LDV | 28.5 | 1.81 | 0.74 |
| FEMALE SPEAKER - fadg0, sa2 | VM | 28.7 | 1.37 | 0.65 |
| | LDV | 26.5 | 1.82 | 0.70 |
| MALE SPEAKER - mccs0, sa1 | VM | 20.4 | 1.31 | 0.59 |
| | LDV | 26.1 | 1.83 | 0.73 |
| MALE SPEAKER - mccs0, sa2 | VM | 23.2 | 1.55 | 0.67 |
| | LDV | 25.8 | 1.96 | 0.68 |
| MALE SPEAKER - mabw0, sa1 | VM | 23.3 | 1.68 | 0.77 |
| | LDV | 28.2 | 1.74 | 0.76 |
| MALE SPEAKER - mabw0, sa2 | VM | 25.5 | 1.81 | 0.72 |
| | LDV | 26.0 | 1.88 | 0.74 |

FIG. 9

| SPEAKER | fadg0 | | mccs0 | | mabw0 | |
|---|---|---|---|---|---|---|
| CLIP | sa1 | sa2 | sa1 | sa2 | sa1 | sa2 |
| SSNR W/O Eq. | 33.2 | 29.7 | 29.8 | 30.4 | 19.6 | 30.7 |
| SSNR WITH Eq. | 35.9 | 33.2 | 30.1 | 31.8 | 20.9 | 27.8 |

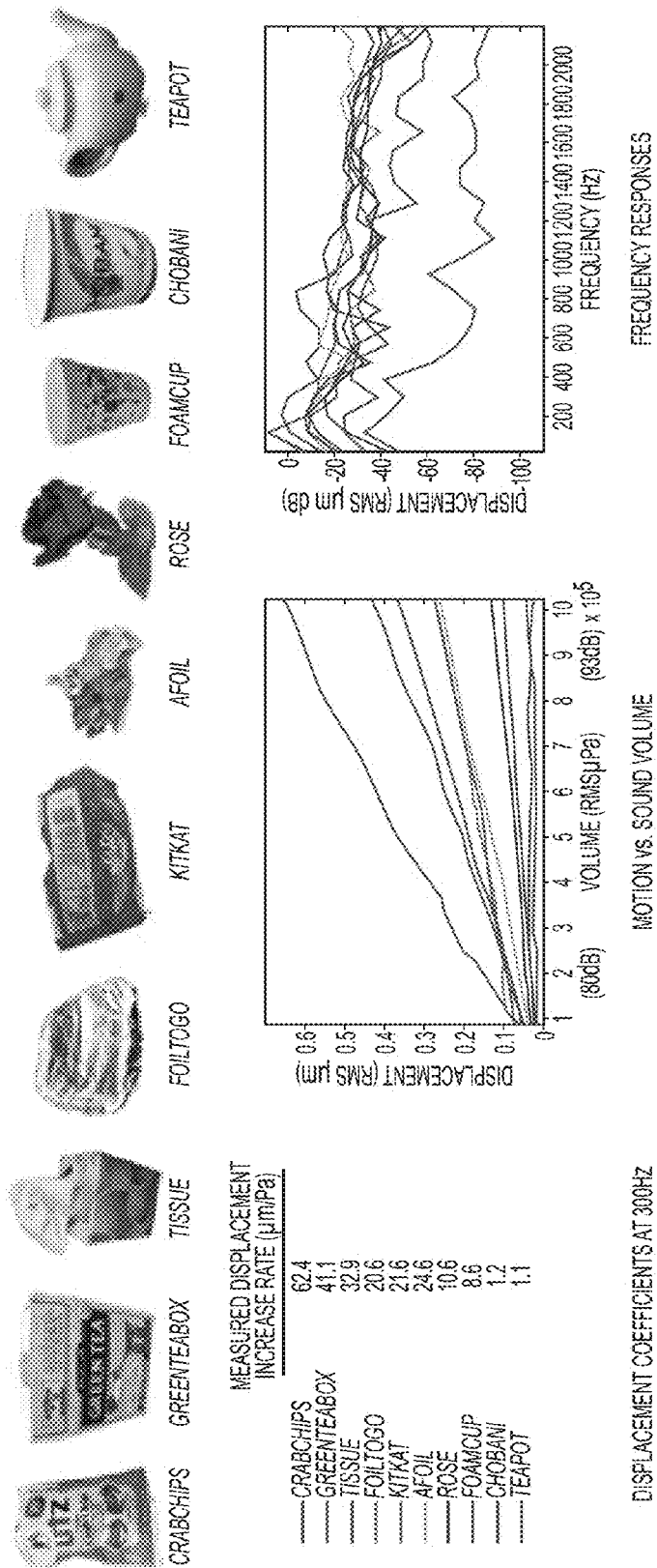

ROLLING SHUTTER IN A VIDEO

CONVERTED TO AUDIO SIGNAL

INPUT SOUND (*THE RAVEN*)

RESULT FROM DSLR

FRAME FROM DSLR VIDEO

RESULT (SIMULATED CAMERA: $E = 0$)

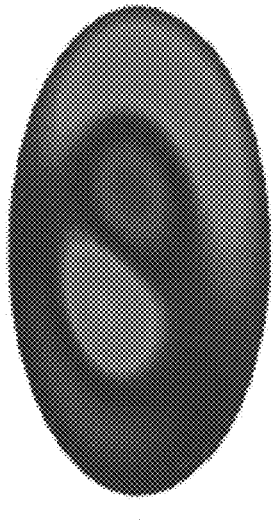
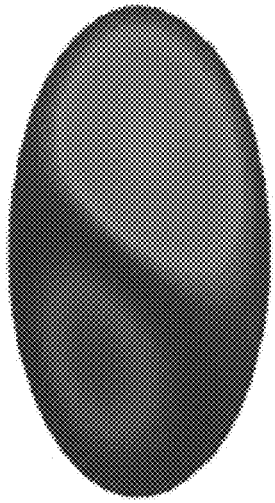
THEORETICALLY-DERIVED MODE SHAPES
FIG. 17C
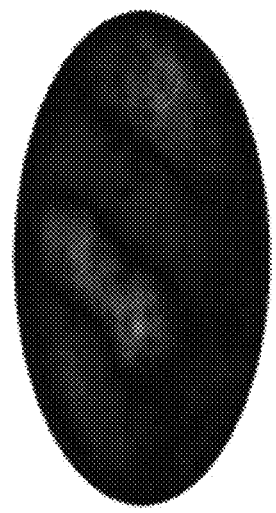
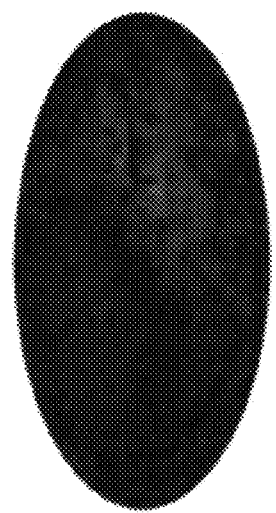
RECOVERED MODE SHAPES
FIG. 17B
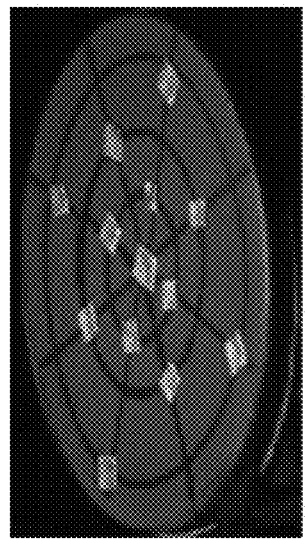
INPUT
FIG. 17A

METHOD AND APPARATUS FOR RECOVERING AUDIO SIGNALS FROM IMAGES

RELATED APPLICATION

This application claims the benefit of U.S. Provisional Application No. 61/856,919, filed on Jul. 22, 2013. The entire teachings of the above application are incorporated herein by reference.

GOVERNMENT SUPPORT

This invention was made with government support under Grant No. 1122374 from the NSF Graduate Research Fellowship Program. The government has certain rights in the invention.

BACKGROUND

Sound waves are fluctuations in pressure that travel through a medium. When sound hits an object, it causes the surface of that object to move. Traditional microphones work by converting the motion of an internal diaphragm into an electrical signal. The diaphragm is designed to move readily with sound pressure so that its motion can be recorded and interpreted as audio. Laser microphones work on a similar principle, but instead of measuring motion of an internal diaphragm, laser microphones measure the motion of a distant object, essentially using the object as an external diaphragm.

SUMMARY

While laser microphones can recover audio from a great distance, they are limited because they depend on precise positioning of a laser and receiver relative to a surface with appropriate reflectance. Attempts have been made to address some of these limitations by using an out-of-focus high-speed camera to record changes in a speckle pattern of reflected laser light; however, these attempts still depend on active illumination with laser light or projected patterns and rely on recording reflected laser light.

Disclosed herein are methods and devices that do not depend on active illumination. Specifically, embodiments do not require illumination of an object or surface with laser light, coherent light, or projected patterns, nor do embodiments require precise alignment of a laser and receiver relative to a moving surface. Instead of relying on laser light or patterns projected onto a surface, normal ambient light from natural or artificial light sources can be used to capture images. Where high frame rates are used, or where exposure times are otherwise relatively small, a correspondingly higher level of ambient light can be relied upon. Features or texturing of surfaces, such as text, markings, edges, roughness, shadows, etc. can be captured in a series of images to reveal local surface motions. Extremely subtle motions of surfaces captured in high-speed videos or even standard cameras of lower frame rates can be analyzed by embodiments disclosed herein, and sounds in the environment of the surfaces and causing the motions of the surfaces can be reconstructed by the embodiments. Furthermore, embodiments make it possible to analyze phase relationships of local motions across a surface and to visualize vibration modes of the surface using similar video images.

A method of recovering audio signals and a corresponding apparatus according to an embodiment of the invention includes combining representations of local motions of a surface to produce a global motion signal of the surface. The local motions are captured in a series of images of features of the surface, and the global motion signal represents a sound within an environment in which the surface is located.

Combining the representations of local motions of the surface can include combining the representations over rows or batches of rows of pixels in at least a subset of the images, over one or more entire images of the series of images, or over a segmented region or unmasked region of the series of images. Combining the representations can also include combining over a region of one or more of the images corresponding to a region of the surface smaller in size than a wavelength of the sound within the environment causing a motion of the surface. Combining the representations can be done with an effective sampling frequency greater than a frame rate with which the series of images is captured.

Combining the representations of local motions can include calculating, by a processor, an average or weighted average of the representations. Combining the representations of local motions to produce the global motion signal of the surface can also include using a transfer function to produce the global motion signal of the surface, the transfer function representing the global motion signal as a function of arbitrary incident sounds within the environment in which the surface is located, or representing the response of the surface of an object to different sound frequencies. Combining the representations of local motions can further include aligning scale and orientation for each pixel in each image, and the method can also include aligning pixels temporally across a plurality of images in the series of images. Combining the representations can also include decomposing each image into multiple dimensions using a complex steerable pyramid structure.

The method of recovering audio signals can further include filtering frequencies in the global motion signal to recover an improved-audibility representation of the sound, removing noise from the global motion signal representing the sound, imparting a known sound to the environment in which the surface is located to calculate a transfer function, and capturing the series of images using an imaging subsystem viewing the surface through an optically transparent sound barrier. The surface can substantially fill an entirety of pixels of the series of images.

An audio signal recovery apparatus and corresponding method according to an embodiment of the invention includes memory configured to store representations of local motions of a surface and a processor configured to combine the representations of local motions to produce a global motion signal of the surface. The local motions are captured in a series of images of features of the surface, and the global motion signal represents a sound within an environment in which the surface is located.

The apparatus can also include a sound transducer configured to impart a known sound to the environment in which the surface is located to calculate a transfer function representing the global motion signal as a function of arbitrary incident sounds within the environment in which the surface is located. The apparatus can also include an imaging subsystem configured to capture the images of the surface through an optically transparent sound barrier.

A method according to an embodiment of the invention includes comparing representations of local motions of the surface to make a determination of which local motions are in-phase or out-of-phase with each other. The local motions are captured in a series of images of features of the surface. The method can also include determining a vibrational mode of the surface based upon the local motions that are in-phase or out-of-phase with each other.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1C illustrates an image region corresponding to a surface region smaller than a sound wavelength, where image pixels are combined over the image region in an embodiment.

FIG. 6A, including FIGS. 6A-1 to 6A-2, is a high-level illustration of a method for recovery of an audio signal from video, according to an embodiment.

FIG. 6B, including FIGS. 6B-1 to 6B-3, illustrates the processing flow of FIG. 6A-2 in more detail.

FIG. 9 is a table that compares the visual microphone method with a laser Doppler vibrometer (LDV).

FIGS. 12A-12C illustrate object motion as function of sound volume and frequency, as measured with a laser Doppler vibrometer, for various objects.

FIGS. 17A-C show experimental and theoretical results of vibration mode analysis using video of a drum head.

DETAILED DESCRIPTION

Figure 1A:
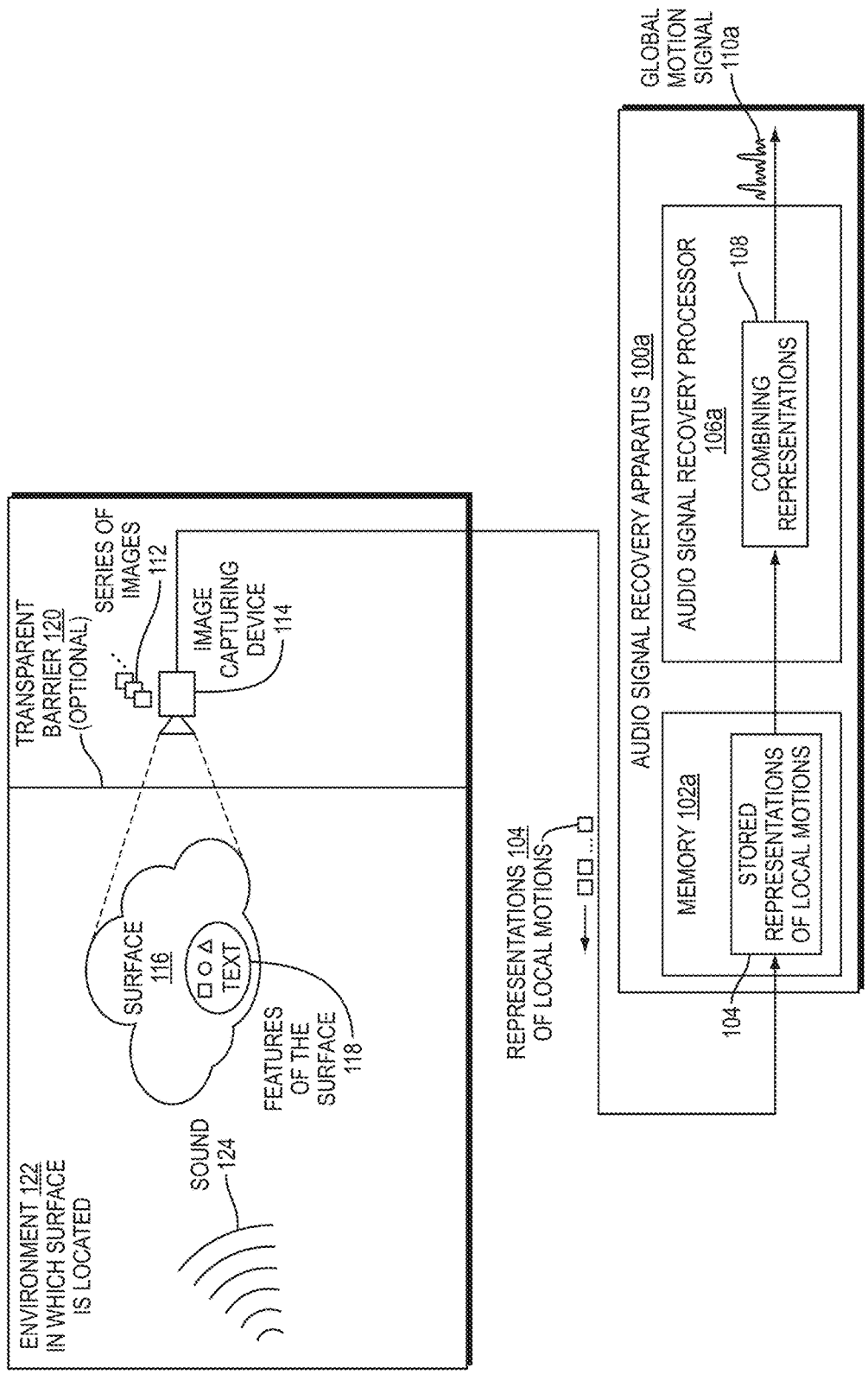
FIG. 1A is a block diagram of an audio signal recovery apparatus according to an embodiment of the invention.

A description of example embodiments of the invention follows.

Sound waves are fluctuations in pressure that travel through a medium. When sound waves hit an object, they cause the surface of that object to move with small vibrations or motions. Depending on various conditions, the surface may move with the surrounding medium or deform according to its vibration modes. In both cases, the pattern of motion contains useful information that can be used to recover sound or visualize vibration phases of the surface. Vibrations in objects due to sound have been used in recent years for remote sound acquisition, which has important applications in surveillance and security, such as eavesdropping on a conversation from afar. However, existing approaches to acquire sound from surface vibrations at a distance are active in nature, requiring a laser beam or pattern to be projected onto the vibrating surface.

Herein are disclosed methods and apparatus that, using only high-speed video of the object or surface thereof, can extract minute local vibrations of an object's surface that are caused by a sound (i.e., sound waves) and produce a global motion signal representing the sound. Because the global motion signal represents the sound causing the local motions or vibrations or oscillations, and because the global motion signal can be used to play back the sound using a sound transducer such as a speaker, the global motion signal can also be referred to as the recovered sound. Thus, the sound that stimulated the local motions or vibrations can be partially recovered. Thus, everyday objects, such as a glass of water, a potted plant, a box of tissues, or a bag of chips, can be essentially turned into "visual microphones." Sounds can be recovered from, for example, high speed footage of a variety of objects with different properties, and both real and simulated data can be used to examine some of the factors affecting the ability to recover sound visually. It should be noted that while motion of objects is referred to herein, it is more precisely the motion of one or more surfaces of an object that are evaluated to recover sound. One purpose of embodiments described herein is to recover sound at a distance in situations in which the sound cannot otherwise be heard by human ears or otherwise accessed using a microphone, for example. Applications further described hereinafter can include surveillance, for example. Further, besides recovering a sound, a recovered global motion signal can be used for additional analysis such as determining the gender of a speaker or determining a number of sound sources in a room (e.g., the number of people speaking).

The quality of recovered sounds can be evaluated using intelligibility and signal-to-noise (SNR) metrics, and input and recovered audio samples can be provided for direct comparison. Rolling shutter in regular consumer cameras can also be leveraged to recover audio from standard frame-rate videos, and the spatial resolution of methods and apparatus described herein can be used to visualize how sound-related vibrations vary over an object's surface. The variation in sound-related vibrations can even be used to recover the vibration modes of an object, as described more fully hereinafter. It should be noted that while both high-speed video and standard frame-rate videos are described herein, any series of images captured by any image acquisition device or subsystem can be used with methods and apparatus described herein, given a sufficiently high frame rate or sampling rate.

Methods and apparatus described herein can be passive. In other words, they can rely on passive illumination of a surface to recover audio signals using video, and do not require active illumination with lasers or projected patterns. Small vibrations in an object responding to sound can be visually detected, and those vibrations can be converted back into an audio signal, turning visible everyday objects into potential microphones. To recover sound from an object, embodiments capture images of (sometimes referred to as "filming") the object using a high-speed video camera. In some embodiments, natural or artificial light illuminating a surface is reflected by the surface toward a camera for imaging the surface. In other embodiments, infrared light emitted by a surface is detected with an infrared imaging device. Local motion signals, or signals representing local motions of different parts of the surface, can then be detected across the dimensions of a complex steerable pyramid built on the recorded video or images. Furthermore, other motion analysis techniques and representations may be used. These local signals can be aligned and averaged into a single, one-dimensional (1D) motion signal that captures global movement of the object over time, which can be further filtered and have noise removed therefrom, or "denoised," to produce an improved recovered sound.

While sound can travel through most matter, not all objects and materials are equally good for visual sound recovery. The propagation of sound waves in a material depends on various factors, such as the density and compressibility of the material, as well as the object's shape. Controlled experiments have been performed to measure the responses of different objects and materials to known and unknown sounds, and the ability to recover these sounds from high-speed video using the disclosed methods and apparatus has been successfully evaluated.

Traditional microphones work by converting the motion of an internal diaphragm into an electrical signal. The diaphragm is designed to move readily with sound pressure so that its motion can be recorded and interpreted as audio.

Laser microphones work on a principle similar to that of traditional microphones, but laser microphones measure the motion of a distant object, essentially using the object as an external diaphragm. This is done by recording the reflection of a laser pointed at the object's surface. The most basic type of laser microphone records the phase of the reflected laser, which gives the object's distance modulo the laser's wavelength. A laser Doppler vibrometer (LDV) resolves the ambiguity of phase wrapping by measuring the Doppler shift of the reflected laser to determine the velocity of the reflecting surface. Both types of laser microphones can recover high quality audio from a distance, but sound recovery depends on precise positioning of a laser and receiver relative to a surface with appropriate reflectance.

Methods and apparatus disclosed herein can be used to extract extremely subtle motions from video or other form of a sequence of images. The motions can be measured and then used to recover sound. The local motion signals referred to herein can be derived from phase variations in a complex steerable pyramid. However, it is also possible to compute the local motion signals using other techniques. For example, classical optical flow and point correlation methods can be used for visual vibration sensing. A 1D motion signal can be output for a single vibrating object, all pixels in an input video can be averaged, for example, to handle extremely subtle motions on the order of one thousandth of a pixel, for example.

Recovering Sound from Video or Other Sequence of Images

FIG. 1A is a block diagram of an audio signal recovery apparatus 108. The apparatus 100a includes memory 102a configured to store representations 104 of local motions of a surface 116. The audio signal recovery apparatus 100a also includes an audio signal recovery processor 106a, which is configured to combine the representations 104 of local motions to produce a global motion signal 110a of the surface. The global motion signal 110 a represents a sound 124 within an environment 122 in which the surface 116 is located.

A series of images 112 of features 118 of the surface 116 is captured by an image capturing device 114. The image capturing device 114 views the surface 116, and this viewing can be done through a transparent barrier 120 in some embodiments.

Figure 1B:
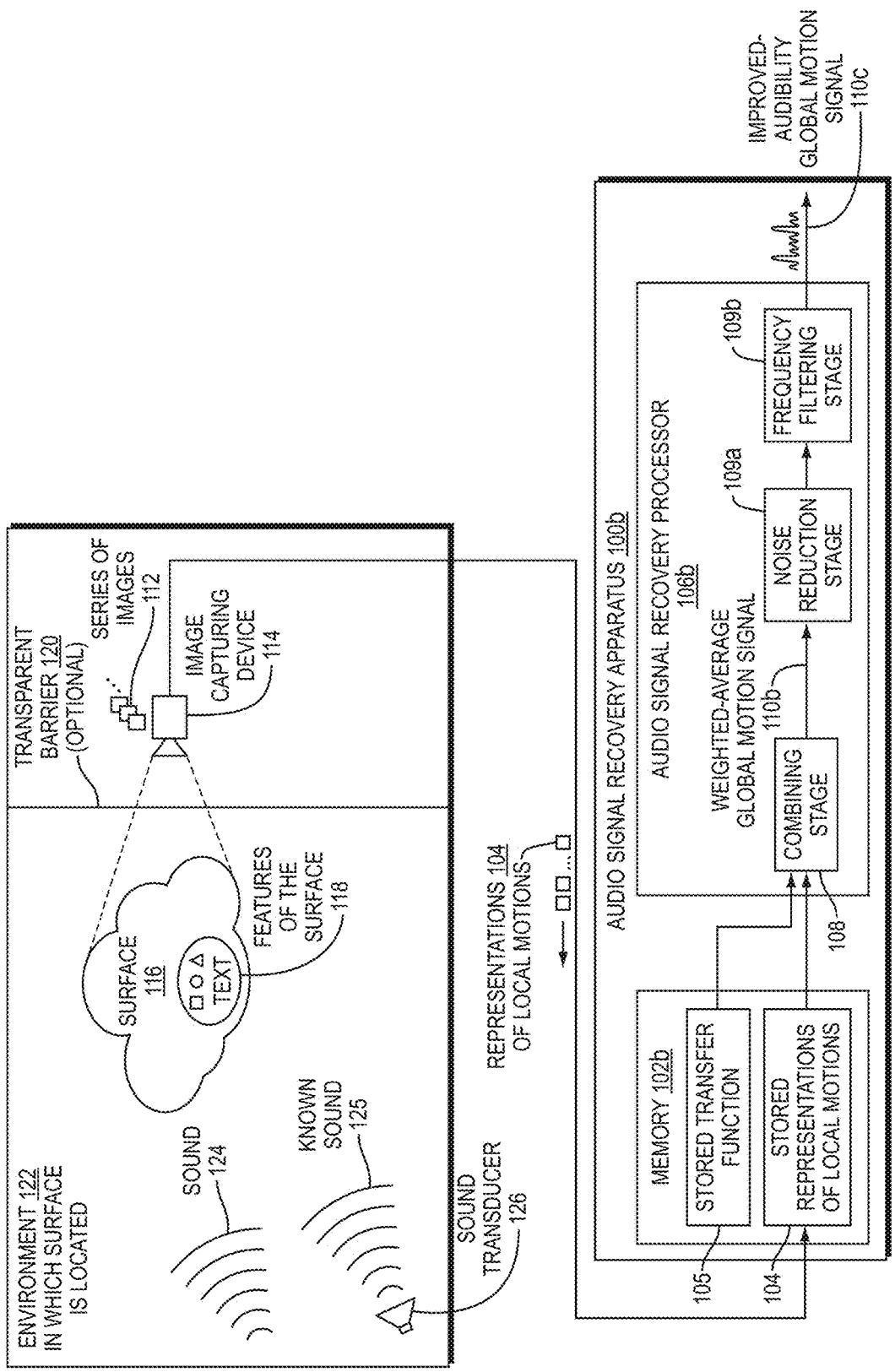
FIG. 1B is a block diagram of an alternative signal recovery apparatus according to an embodiment of the invention.

FIG. 1B is a block diagram of an alternative audio signal recovery apparatus 100b. The apparatus 100b is similar to the apparatus 100a in some respects, but the apparatus 100b includes additional features. For example, the apparatus 100b includes memory 102b configured to store both the representations 104 of local motions and a transfer function 105, which is used by a processor 106b to produce the global motion signal 110b. The stored transfer function 105 represents the global motion signal as a function of arbitrary incident sounds within the environment 122 in which the surface 116 is located. At the combining stage 108 of the processor 106b, the processor uses the stored transfer function 105, as well as the stored representations 104, to produce a global motion signal 110b. The global motion signal 110b is a weighted average global motion signal calculated by the processor 106b as part of combining the representations 104 of local motions. The audio signal recovery processor 106b also removes noise from the global motion signal at a noise reduction stage 109a. The processor 106b also filters frequencies in the weighted average global motion signal 110b, including removing frequencies from the signal that are not audible to a human ear. The noise reduction stage 109a and frequency filtering stage 109b are used to produce an improved-audibility global motion signal 110b.

A sound transducer 126 is located in the environment 122 in which the surface is located. The sound transducer 126 imparts a known sound 125 to the environment 122 in which the surface 116 is located. The imparted known sound 125 causes local motions of the surface 116 that can be captured in images and used to develop the stored transfer function 105. In other embodiments, the sound transducer 126 is part of the audio signal recovery apparatus 100b.

FIG. 1C illustrates a principle that, in some embodiments, it can be advantageous to combine the representations of local motions of the surface over a region of one or more of the images corresponding to a region of the surface smaller in size than a wavelength of the sound made in the environment to cause motion of the surface. A sound 132 is made in an environment in which a surface 128 is located. Although the surface 128 is larger than the wavelength 132, a region 130 of the surface is smaller than the sound wavelength 132. Thus, in the pixel array 134, and image 128' of the surface 128 includes a corresponding image region 130' of the image 128' of the surface 128. As further described hereinafter in conjunction with FIG. 2B, combining the representations of the local motions can be limited to only certain pixels of a pixel array. In FIG. 1C, representations of the local motions include individual pixel measurements made over time, and combining the representations can be limited to only the image region 130' corresponding to the region 130 on the surface, which is smaller than the sound wavelength 132.

This arrangement can be beneficial because regions of the surface within a sound wavelength can move coherently with each other, while regions of the surface covering an area greater than the sound wavelength can be out-of-phase. However, where representations of local motions are combined over an image region corresponding to a surface region larger than a sound wavelength, the algorithm can be modified accordingly to accommodate the circumstance.

Figure 2A:
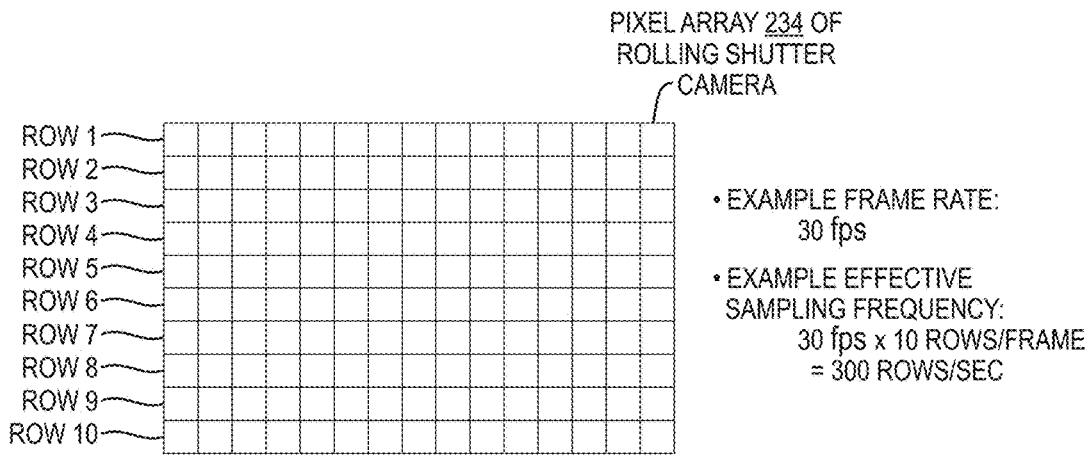
FIG. 2A illustrates a pixel array used in a rolling shutter camera in an embodiment.

FIG. 2A illustrates a pixel array 234 of the camera with a rolling shutter. Rolling shutter cameras, such as those that use CMOS sensors, can be used to achieve an effective sampling frequency greater than a frame rate with which the series of images is captured. In a rolling shutter camera, rows of pixels, such as rows 1-10 shown in FIG. 2A, are read from the pixel array row by row over a period of time, instead of all rows representing a single time. Thus, even with a relatively low frame rate such as 30 frames per second (FPS), the ten rows of the pixel array 234 can be read at different times to achieve an effective sampling frequency of 30 FPS×10 rows/frame=300 rows/sec, which is much higher than the frame rate. Where the entire frames capture one or more surface features that move coherently with the sound, images from a rolling shutter camera can be used instead of images from a high-speed camera to capture local motions of the surface with sufficient temporal resolution to recover a global motion signal representing a sound. The effective sampling frequency or rate can also be limited by exposure time due to noise considerations, as further exemplified hereinafter.

Figure 2B:
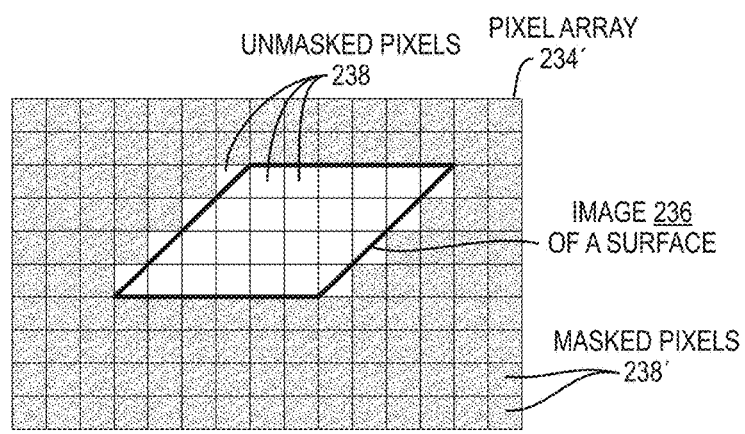
FIG. 2B illustrates a masked pixel array used in an embodiment.

FIG. 2B illustrates a pixel array 234' having an image 236 of the surface. Representations of the motions of the surface can include the pixel values over time, and combining the representations of motions of the surface can be done over, for example, only unmasked pixels 238 covering the region of the image 236. The masked pixels 238' can be excluded from the combination of the representations in order to increase resolution of the motion of interest. Similarly, the masking can be done over a region corresponding to a portion of the surface, or the representations can be combined over entire images of a series of images. The unmasked pixels 238 can also be referred to as a segmented region of the pixel rate 234'. A segmented region or unmasked region can cover any arbitrary portion of the pixel array 234', as necessary to analyze portions of an image including the surface, portions of a surface that are oscillating in-phase with one another, portions smaller than a wavelength of the sound in the environment, etc.

Figure 3:
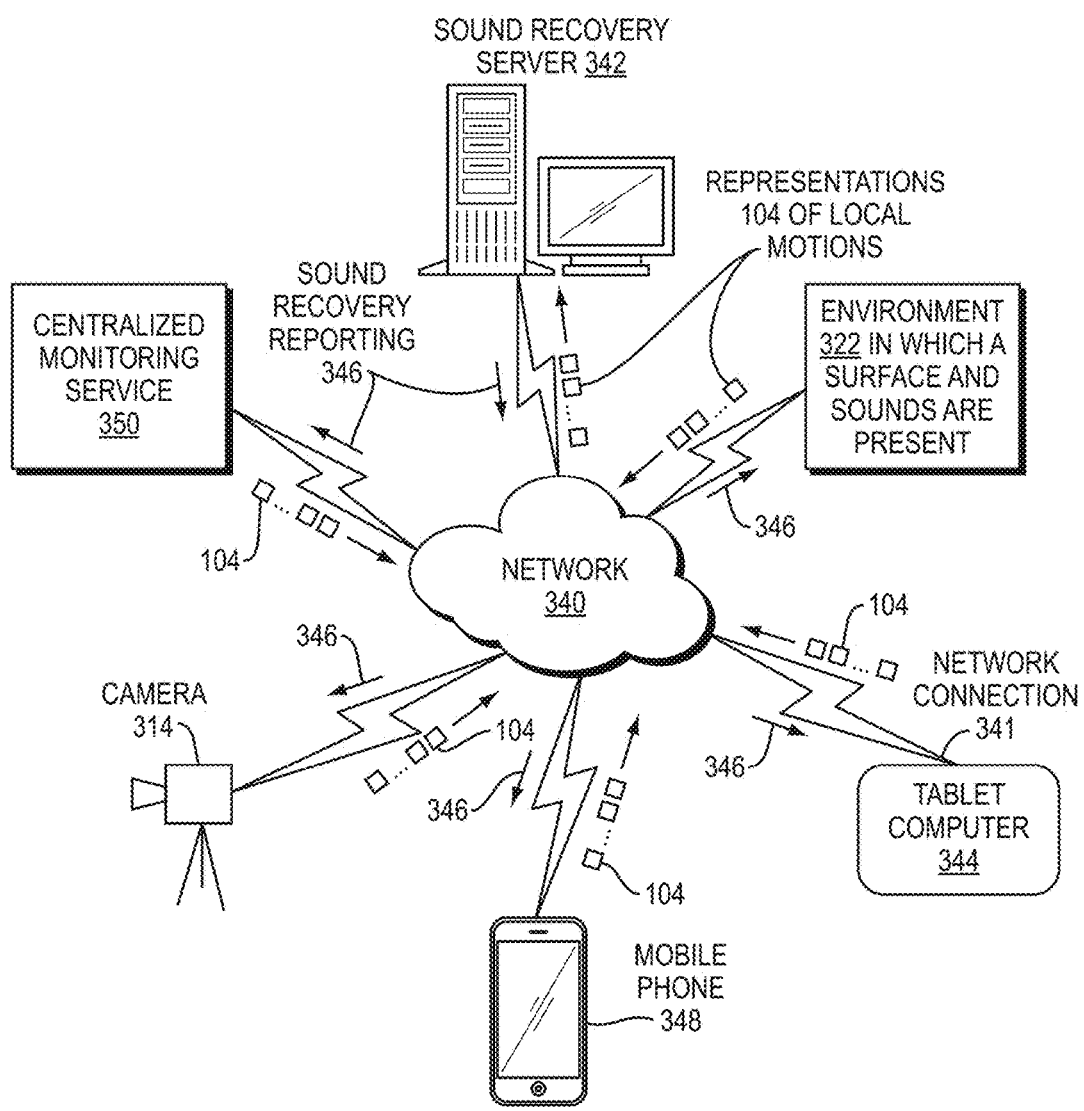
FIG. 3 is a schematic illustration of a network environment in which embodiments of the invention can be used.

FIG. 3 is a schematic illustration of a network environment 340 in which embodiments of the invention can operate. A sound recovery server 342 can be in communication with various devices and locations via the network 340, which includes network connections 341. The network connections 341 can include, for example, Wi-Fi signals, Ethernet connections, radio or cell phone signals, serial connections, or any other wired or wireless form of communication between devices or between a device and a network.

An environment 322 in FIG. 3 is similar to the environment 122 in FIGS. 1A and 1B and includes a surface and sounds (not shown). Representations 104 of local motions are sent from the environment 322, through the network 340, to the sound recovery server 342. The sound recovery server 342 responds with sound recovery reporting 346, back through the network 340, to the environment 322. The sound recovery reporting 346 can include a global motion signal, an audio signal recovered, or an indication of the presence of sounds and the environment 322, such as an indication that the human voice is present.

Devices such as the camera 314, mobile phone 348, and tablet computer 344 can be configured to capture a series of images of features of the surface including local motions of the surface. These devices can send representations of the local motions of the surface to the sound recovery server 342 via the network 340. The representations can include raw video images, series of still images, or compressed pixel values, for example, or any other information representing local motions of the surface captured in images of features of the surface. The sound recovery server 342 is configured to provide sound recovery reporting 346 to the respective devices. The sound recovery reporting 346 can include either a recovered sound signal, a compressed sound signal, or an indication of the presence of the sound.

Also connected to the network 340 is a centralized monitoring surface 350. The centralized monitoring service 350 can include a government, military, or industrial-use center that can store the video images for law enforcement or military surveillance purposes, for example. Where necessary, the centralized monitoring service 350 can upload representations 104 of local motions captured in the video images to the sound recovery server 342 via the network 340. The centralized service 350 can then receive sound recovery reporting 346, as previously described.

The inventors have recognized that the vibrations that sound causes in an object often create enough visual signal to partially recover the sounds that produced them, using only a high-speed video of the object. Remarkably, it is possible to recover comprehensible speech and music in a room from just a video of a bag of chips, as further illustrated in FIGS. 4 and 5).

Figure 4:
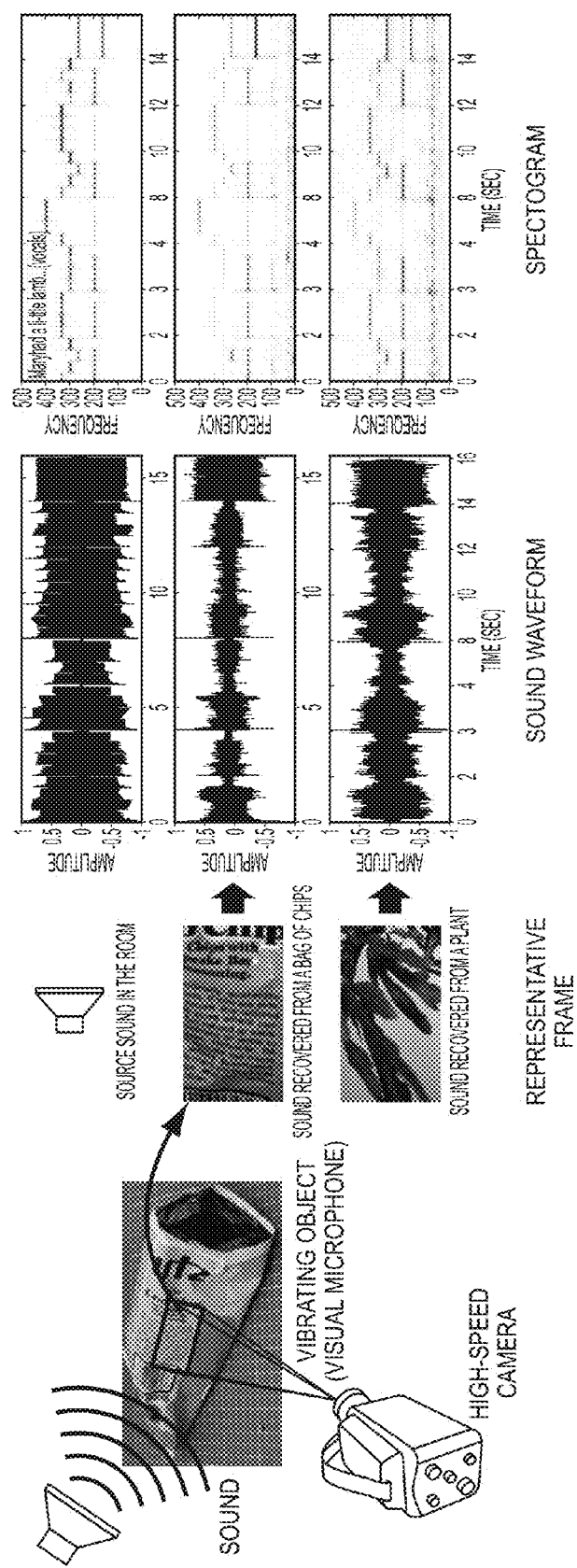
FIG. 4 is an overview of sound recovery from a bag of chips and a plant, according to an embodiment method and corresponding apparatus.

FIG. 4 is an overview of sound recovery from a bag of chips and a plant, according to an embodiment method. On the left side of FIG. 4, sound waves impinge on object (in this case, an empty bag of chips). The sound waves cause extremely small surface vibrations in the bag of chips. These small vibrations can be extracted from high speed video, and the sound that produced them can be reconstructed or recovered using the object as a visual microphone from a distance. On the right side of FIG. 4, an instrumental recording of "Mary Had a Little Lamb" (top row) is played through a loudspeaker (sound source), then recovered from video of different objects: a bag of chips (middle row), and the leaves of a potted plant (bottom row). For the source and each recovered sound, the waveform and spectrogram (the magnitude of the signal across different frequencies over time) are shown. The spectrograms are shown in linear scale, with darker colors representing higher energy).

Figure 5A:
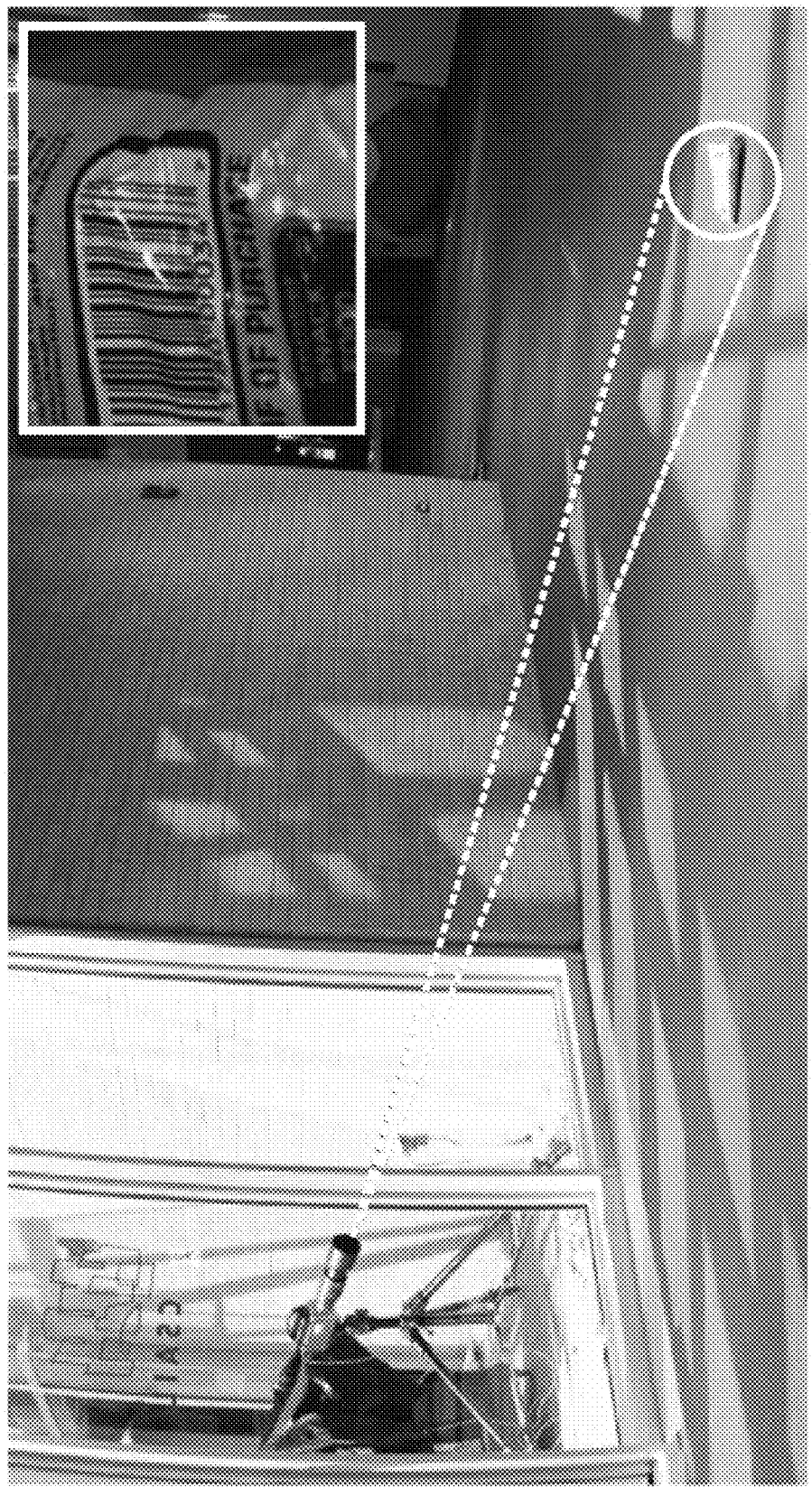
FIGS. 5A-5C illustrate speech sounds recovered from a 4 kHz video of a bag of chips filmed through soundproof glass.
Figure 5C:
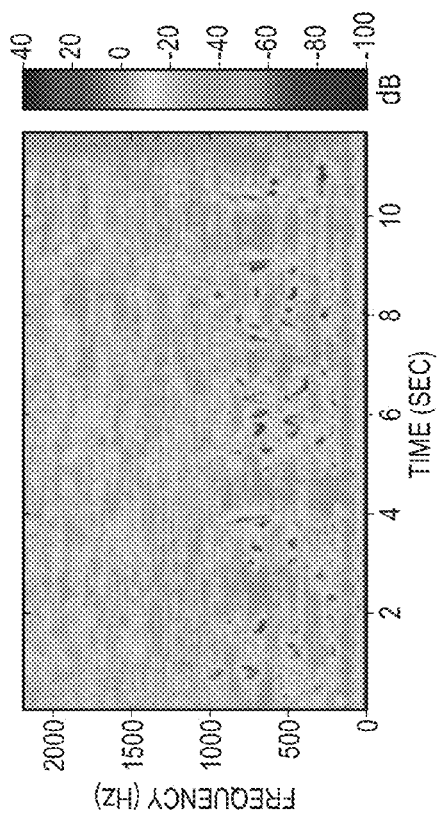
Figure 5B:
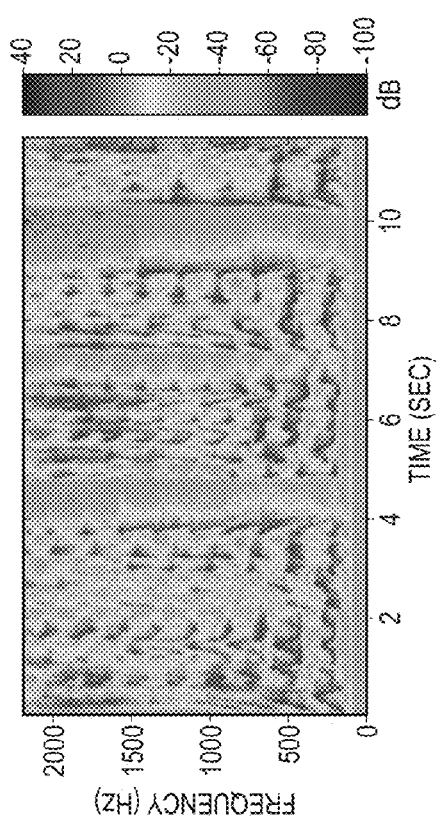

FIGS. 5A-5C illustrate speech sounds recovered from a 4 kHz video of a bag of chips filmed through soundproof glass. The chip bag (on the floor on the bottom right in FIG. 5A is lit by natural sunlight only. The camera (on the left in FIG. 5A) is positioned outside the room behind thick soundproof glass. A single frame from the recorded video (400× 480 pixels) is shown in the inset of FIG. 5A. The speech "Mary had a little lamb . . . Welcome to SIGGRAPH!" was spoken by a person (not shown) near the bag of chips. FIGS. 5B and 5C show the spectrogram of the source sound recorded by a standard microphone next to the chip bag, and the spectrogram sound recovered by a method described herein, respectively. The recovered sound is noisy, but still comprehensible. It should be pointed out that although soundproof glass is an example of a sound barrier though which video can be recorded for sound recovery, the technique also applies to where video is collected though other sound barriers that are not completely soundproof, yet inhibit sound transfer to any degree.

FIG. 6A is high-level overview of how an embodiment visual microphone works. An input sound (to be recovered) consists of fluctuations in air pressure at the surface of some object (a cup in FIG. 6A-1). These fluctuations cause the object to move, resulting in a pattern of displacement over time that can be recorded with a camera. The visual microphone is modelled as a system that operates on sound. FIG. 6A-1 shows the object's response to sound—taking as input changes in air pressure, measured in Pascals, and producing physical displacement of the object over time, measured in millimeters. The response of the object to the sound depends on various factors such as the sound level at the object and the object's material and shape. A camera then records the object, transforming the physical displacements into pixel motions in a video.

FIG. 6A-2 shows a spatiotemporal processing flow that can be used to recover the output sound. The processing flow shown in FIG. 6A-2 is also shown in more detail in FIGS. 6B-1 to 6B-3. The input to the processing flow is a video, V(x, y, t), of an object. In this section, high-speed videos (1 kHz-20 kHz) are particularly considered, while lower frame rates are discussed hereinafter in a later section. The spatiotemporal processing pipeline transforms the motions in the video back into sound. The relative motion of the object and camera is assumed to be dominated by vibrations due to a sound signal, s(t). The goal is to recover s(t) from V, and this embodiment includes three steps.

First, the input video V is decomposed into spatial sub-bands corresponding to different orientations and scales r. The changes in local phase over time across different spatial scales and orientations (two scales and two orientations in this figure) are then calculated. The motion signals are then decomposed through a sequence of averaging and alignment operations to produce a single, global motion signal for the object. Finally, audio denoising and filtering techniques techniques are applied to the object's motion signal to obtain an improved-audibility global motion signal. This signal is related to the sound pressure wave that caused the object to vibrate, essentially turning that object into a microphone. Note that although the visualization of FIGS. 6B-1 to 6B-3 shows the decomposition for the entire input frame, the analysis is performed only for a region on the vibrating surface (membrane in this illustration), and the resulting signal, shown in "output" in FIG. 6A, corresponds to that region only. The resulting 1D signal is unitless but is correlated with the input pressure (in Pascals) and can therefore be played and analyzed as sound.

Computing Local Motion Signals or Representations of Local Motions

Phase variations in a complex steerable pyramid representation of the video V can be used to compute local motions. Since the local motions can be represented in different ways, representations of local motions of a surface are referred to herein. A complex steerable pyramid (see Simoncelli, E. P., Freeman, W. T., Adelson, E. H., and Heeger, D. J. 1992. "Shiftable multi-scale transforms," *IEEE Trans. Info. Theory* 2, 38, 587-607; Portilla, J., and Simoncelli, E. P. 2000, "A parametric texture model based on joint statistics of complex wavelet coefficients," *Int. J. Comput. Vision* 40, 1 (October), 49-70) is a filter bank that breaks each frame of the video V(x, y, t) into complex-valued sub-bands corresponding to different scales and orientations. The basis functions of this transformation are scaled and oriented Gabor-like wavelets with both cosine- and sine-phase components. Each pair of cosine- and sine-like filters can be used to separate the amplitude of local wavelets from their phase. Specifically, each scale r and orientation is a complex image that can be expressed in terms of amplitude A and phase $\varphi$ as $$A(r,\theta,x,y,t)e^{i\varphi(r,\theta,x,y,t)} \quad (1)$$

The local phases $\varphi$ computed in this equation can be subtracted from the local phase of a reference frame $t_0$ (typically the first frame of the video) to compute the phase variations $$\varphi_v(r,\theta,x,y,t)=\varphi(r,\theta,x,y,t)-\varphi(r,\theta,x,y,t_0). \quad (2)$$

For small motions, these phase variations are approximately proportional to displacements of image structures along the corresponding orientation and scale (Gautama, T., and Van Hulle, M., 2002, "A phase-based approach to the estimation of the optical flow field using spatial filtering," *Neural Networks, IEEE Transactions on* 13, 5 (September), 1127-1136). Thus, these local phase variations are one type of representation of local motion. Other types of representations of local motions, such as pixel value fluctuation over time or fluctuations of pixel groups over time, or other techniques that measure motion by explicitly tracking pixels over time, for example, are also possible.

Computing the Global Motion Signal

For each orientation and scale r in the complex steerable pyramid decomposition of the video, a spatially weighted average of the local motion signals can be calculated to produce a single, global motion signal $\Phi(r, \theta, t)$. A weighted average is calculated because local phase is ambiguous in regions that do not have much texture, and, as a result, motion signals in these regions are noisy. However, for some situations, such as where a subject surface is highly textured, good global motion signals can be recovered without a weighted average. The complex steerable pyramid amplitude A gives a measure of texture strength, and so each local signal can be weighted by its (squared) amplitude, for example:

$$\Phi_i(r, \theta, t) = \sum_{x,y} A(r, \theta, x, y)^2 \varphi_v(r, \theta, x, y, t). \quad (3)$$

Before averaging the $\Phi(r, \theta, t)$ over different scales and orientations, they can be aligned temporally in order to prevent destructive interference. To understand why this is done, the case in which only two orientations (x and y) from a single spatial scale are sought to be combined can be considered. A small Gaussian vibration in the direction y=−x can be considered, for example. Here, changes in the phases of x and y orientations will be negatively correlated, always summing to a constant signal. However, if the two phase signals are aligned (by shifting one of them in time), the phases can be caused to add constructively. The aligned signals are given by $\Phi(r_i, \theta_i, t-t_i)$, such that $$t_i = \underset{t_i}{\mathrm{argmax}} \Phi_0(r_0, \theta_0, t)^T \Phi_i(r_i, \theta_i \mid t-t_i), \quad (4)$$

where i indexes all scale-orientation pairs (r, θ), and Φ(r₀, θ₀, t) is an arbitrary choice of reference scale and orientation. The global motion signal is then given by:

$$\hat{s}(t) = \sum_i \Phi_i(r_i, \theta_i, t - t_i), \quad (5)$$

which can be scaled and centered to the range [−1, 1].

Denoising

The recovered global motion signal can then be further processed to improve its SNR, resulting in an improve-audibility global motion signal. In many videos, there can be a high energy noise in the lower frequencies that does not correspond to audio. This can be addressed by applying a high-pass Butterworth filter with a cutoff of 20-100 Hz (for most examples, 1/20 of the Nyquist frequency). For very noisy cases, this high-pass filter can even be applied to the Φ(r, θ, t) signals before alignment to prevent the noise from affecting the alignment.

The choice of algorithm for additional denoising can depend on the target application. Specifically it can be relevant whether accuracy or intelligibility is a concern. For applications targeting accuracy, a technique known as spectral subtraction (Boll, S. 1979, "Suppression of acoustic noise in speech using spectral subtraction," *Acoustics, Speech and Signal Processing, IEEE Transactions on* 27, 2, 113-120) can be used. On the other hand, for intelligibility, a perceptually motivated speech enhancement method (Loizou, P. C., 2005, "Speech enhancement based on perceptually motivated bayesian estimators of the magnitude spectrum," *Speech and Audio Processing, IEEE Transactions on* 13, 5, 857-869) can be used. The latter method works by computing a Bayesian optimal estimate of the denoised signal with a cost function that takes into account human perception of speech. For all of the results presented herein, signals were denoised automatically with one of these two algorithms. The results may be further improved by using more sophisticated audio denoising algorithms available in professional audio processing software (some of which require manual interaction).

Different frequencies of the recovered signal might be modulated differently by the recorded object. Hereinafter, in a later section, it is shown how to use a known test signal to characterize how an object attenuates different frequencies though a transfer function, and then how to use this information to equalize unknown signals recovered from the same object (or a similar one) in new videos.

Experiments

Figure 7:
FIG. 7 illustrates one example of a controlled experimental setup.

FIG. 7 illustrates one example of a controlled experimental setup. Sound from an audio source, such as a loudspeaker (a) excites an ordinary object (b). A high-speed camera (c) records the object. Sound is then recovered from the recorded video. In order to minimize undesired vibrations, the objects were placed on a heavy optical plate, and for experiments involving a loudspeaker, the loudspeaker was placed on a surface separate from the surface containing the objects, on top of an acoustic isolator.

A variety of experiments were performed to test the methods described herein. All the videos referred to in this section were recorded indoors with a Phantom V10 high speed camera. The setup for these experiments consisted of an object, a loudspeaker, and the camera, arranged as shown in FIG. 7. The loudspeaker was always placed on its own stand, separate from the surface holding the object, in order to avoid contact vibrations. The objects were lit with photography lamps and filmed at distances ranging from 0.5 meter to 2 meters. In other experiments (e.g., the experiment illustrated in FIG. 5), sound was recovered from greater distances without the aid of photography lamps. Video frame rates are in the range of 2 kHz-20 kHz, with resolutions ranging from 192×192 pixels to 700×700 pixels. Sounds were played at loud volumes ranging from 80 dB (an actor's stage voice) to 110 dB (comparable to a jet engine at 100 meters). Lower volumes were also explored, as described in conjunction with FIG. 5 and hereinafter. Videos were processed using complex steerable pyramids with 4 scales and 2 orientations, which were computed using publicly available code (Portilla, J., and Simoncelli, E. P. 2000, "A parametric texture model based on joint statistics of complex wavelet coefficients," *Int. J. Comput. Vision* 40, 1 (October), 49-70). Processing each video typically took 2 to 3 hours using MATLAB on a machine with two 3.46 GHz processors and 32 GB of RAM.

A first set of experiments tested the range of frequencies that can be recovered from different objects. This was done by playing a linear ramp of frequencies through the loudspeaker, then determining which frequencies could be recovered by our technique. A second set of experiments focused on recovering human speech from video. For these experiments, several standard speech examples from the TIMIT dataset (Fisher, W. M., Doddington, G. R., and Goudie-Marshall, K. M. 1986, "The darpa speech recognition research database: specifications and status," in *Proc. DARPA Workshop on speech recognition*, 93-99) were played through a loudspeaker, as well as live speech from a human sound source (here, the loudspeaker in FIG. 7 was replaced with a talking human).

Sound Recovery from Different Objects/Materials

In the first set of experiments, a ramp signal, consisting of a sine wave that increasing linearly in frequency over time, was played at a variety of objects. Results are shown in FIG. 8.

Figures 8A, 8B:
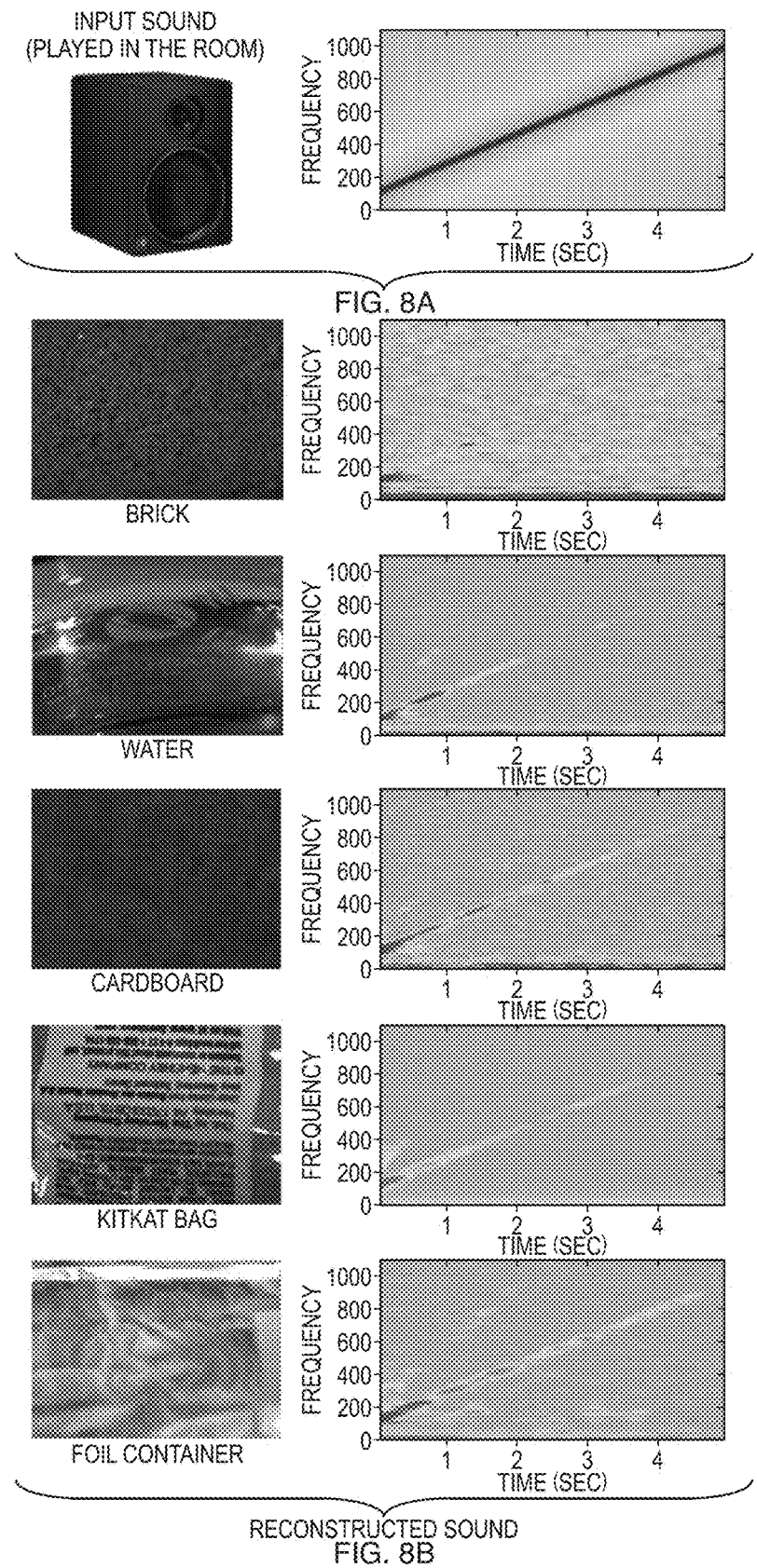
FIGS. 8A-8B illustrate input and results of experiments reconstructing sound from videos of different objects and materials.

FIGS. 8A-8B illustrate input and results of experiments reconstructing sound from videos of different objects and materials. FIG. 8A shows the spectrogram of our input sound, which increases from 100 Hz to 1000 Hz over 5 seconds. A linear ramp (FIG. 8A) ranging from 100 Hz to 1000 Hz was played through a loudspeaker, and the sound was reconstructed from videos of different objects and materials (FIG. 8B). FIG. 8B shows the spectrograms of signals recovered from 2.2 kHz videos of a variety of objects with different material properties. The brick at the top of FIG. 8B was used as a control experiment, in which only little signal recovery was expected because the object is rigid and heavy. The low-frequency signal recovered from the brick (see the spectrogram visualized for Brick in FIG. 8B may come from motion of the brick or the camera, but the fact that this signal is very weak suggests that camera motion and other unintended factors in the experimental setup have at most a minor impact on our results. In particular, while almost no signal is recovered from the brick, much better signal is recovered from the other objects shown. In the water experiment shown in FIG. 8B, the camera was pointed at one side of a clear mug containing water, and the water surface was just above a logo printed on the side of the mug. Motion of the water's surface resulted in changing refraction and moving specular reflections.

In almost all of the results, the recovered signal is weaker in higher frequencies. This is expected, as higher frequencies produce smaller displacements and are attenuated more heavily by most materials. This is shown more explicitly with data from a laser Doppler vibrometer in hereinafter in a later section. However, the decrease in power with higher frequencies is not monotonic, possibly due to the excitement of vibration modes. Not surprisingly, lighter objects that are easier to move tend to support the recovery of higher frequencies better than more inert objects.

Speech Recovery

Speech recovery is one important application of the visual microphone. To test the ability to recover speech, standard speech examples from the TIMIT dataset (Fisher, W. M., Doddington, G. R., and Goudie-Marshall, K. M. 1986, "The darpa speech recognition research database: specifications and status," in *Proc. DARPA Workshop on speech recognition*, 93-99) were used, as well as live speech from a human speaker reciting the poem "Mary had a little lamb." In most of the speech recovery experiments, a bag of chips was filmed at 2200 frames per second (FPS or fps) with a spatial resolution of 700×700 pixels. Recovered signals were denoised with a perceptually motivated speech enhancement algorithm (see Loizou, P. C., 2005, "Speech enhancement based on perceptually motivated bayesian estimators of the magnitude spectrum," *Speech and Audio Processing, IEEE Transactions on* 13, 5, 857-869). The results were evaluated using quantitative metrics from the audio processing community. To measure accuracy, a Segmental Signal-to-Noise Ratio (SSNR) (Hansen, J. H., and Pellom, B. L. 1998, "An effective quality evaluation protocol for speech enhancement algorithms," in ICSLP, vol. 7, 2819-2822), which averages local SNR over time, was used. To measure intelligibility, a perceptually-based metric (Taal, C. H., Hendriks, R. C., Heusdens, R., and Jensen, J., 2011, "An algorithm for intelligibility prediction of time-frequency weighted noisy speech," *Audio, Speech, and Language Processing, IEEE Transactions on* 19, 7, 2125-2136) was used.

FIG. 9 is a table comparing results from a visual microphone (VM) method described herein with results from a laser Doppler vibrometer (LDV). Speech from the TIMIT dataset was recovered from a bag of chips by both methods simultaneously. Both recovered signals were denoised using the perceptually motivated speech enhancement algorithm. The recovered signals were evaluated using Segmental SNR (SSNR, in dB), Log Likelihood Ratio mean (LLR) and the intelligibility metric previously described. For each comparison in FIG. 9, the better score is shown in bold.

For the results in FIG. 9, the Log Likelihood Ratio (LLR) is also provided. LLR (Quackenbush, S. R., Barnwell, T. P., and Clements, M. A., 1988, *Objective measures of speech quality*," Prentice Hall Englewood Cliffs, N.J.) is a metric that captures how closely the spectral shape of a recovered signal matches that of the original clean signal. The results can also be evaluated visually by looking at the spectrograms of the input speech and recovered signals, as described hereinafter in conjunction with FIG. 11. For the VM method, recovered audio was comparable to that of the laser vibrometer when sampled at the same rate as the video, as measured by the intelligibility metric. However, the LDV required active lighting, and for this purpose, a piece of retro-reflective tape was affixed on the object for the laser beam to be reflected off the object and go back to the vibrometer. Without the retro-reflective tape, the quality of the vibrometer signal was significantly worse.

Up to the Nyquist frequency of the videos, the recovered signals closely match the input for both pre-recorded and live speech. In one experiment, a bag of chips was captured on video at 20,000 FPS, and some of the higher frequencies of the speech could be recovered, as illustrated hereinafter in the bottom right of FIG. 11. The higher frame rate resulted in reduced exposure time, and, therefore, more image noise, which is why the resulting figure is noisier than the results at 2200 Hz. However, even with this added noise, speech in the reconstructed audio could be understood qualitatively.

Transfer Functions and Equalization

The ramp signal previously described in conjunction with FIG. 8A was used to characterize the (visual) frequency response of an object in order to improve the quality of signals recovered from new observations of that object. In theory, if the object is considered as a linear system, Wiener deconvolution can be used to estimate the complex-valued transfer function associated with the system, and that transfer function could then be used to deconvolve new observed signals in an optimal way (in the mean squared error sense). In practice, however, this approach can be highly susceptible to noise and nonlinear artifacts. Instead, a simpler method was employed that first uses the short time Fourier transform of a training example (the linear ramp) to calculate frequency transfer coefficients at a coarse scale, then equalizes new observed signals using these transfer coefficients.

Figure 10A:
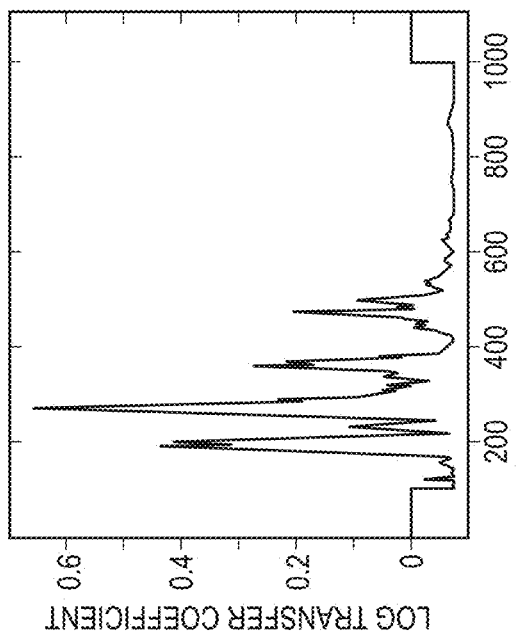
FIGS. 10A-10C illustrate use of a known ramp signal to estimate the transfer coefficients for a bag of chips.
Figure 10B:
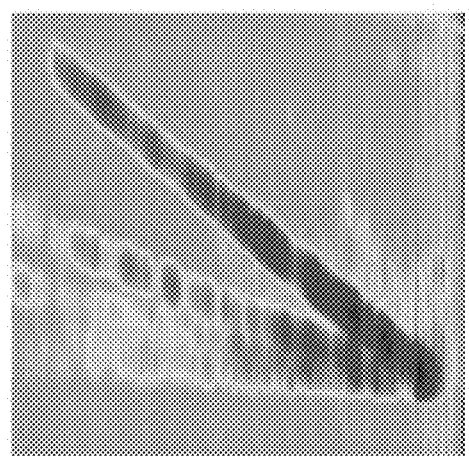
Figure 10C:

FIG. 10 illustrates use of a known ramp signal to estimate the transfer coefficients for a bag of chips. These transfer coefficients were then used to equalize new unknown signals recovered from the same bag. FIG. 10A shows one frame from a video of the bag of chips. FIG. 10B illustrates the recovered ramp signal used to compute transfer coefficients. FIG. 10C illustrates the log transfer coefficients (set to 1 outside the range of frequencies in the ramp). The table in FIG. 10 shows SSNR for six speech examples with and without the equalization. Spectral subtraction is applied again after equalization, as boosting attenuated frequencies tends to boost noise in those frequencies as well. Note that the denoising method SSNR values reported in FIG. 10 are different from FIG. 9, as the equalization focuses on accuracy over intelligibility.

Transfer coefficients were derived from the short time power spectra of an input/output pair of signals (like those shown in FIG. 8). Each coefficient corresponds to a frequency in the short time power spectra of the observed training signal, and each coefficient is computed as a weighted average of that frequency's magnitude over time. The weight at every time is given by the short time power spectrum of the aligned input training signal. Given that the input signal contains only one frequency at a time, this weighting scheme ignores nonlinear artifacts such the frequency doubling seen in FIG. 5B.

Once transfer coefficients are obtained, they can be used to equalize new signals. There are many possible ways to do this. For this work, gains were applied to frequencies in the short time power spectra of the new signal, and then the signal in the time domain was resynthesized. The gain applied to each frequency is proportional to the inverse of its corresponding transfer coefficient raised to some exponent k.

Results of applying an equalizer derived from a chip bag to speech sequences recovered from the same object are shown in FIG. 5. In the absence of noise, k would be set to 1, but broad spectrum noise compresses the range of the estimated transfer coefficients. Using a larger k can compensate for this. For this work, k was manually tuned on one of the female speech examples. Then, the resulting equalizer was applied to all six speech examples. Since this equalization is designed to improve the faithfulness of a recovered signal rather than the intelligibility of speech, spectral subtraction was used for denoising and SSNR to evaluate the results. It should be noted that calibration and equalization (and use of transfer functions) are optional. In particular, all of the results described herein other than those of FIG. 10 assume no prior knowledge of the recorded object's frequency response.

Figure 11A:
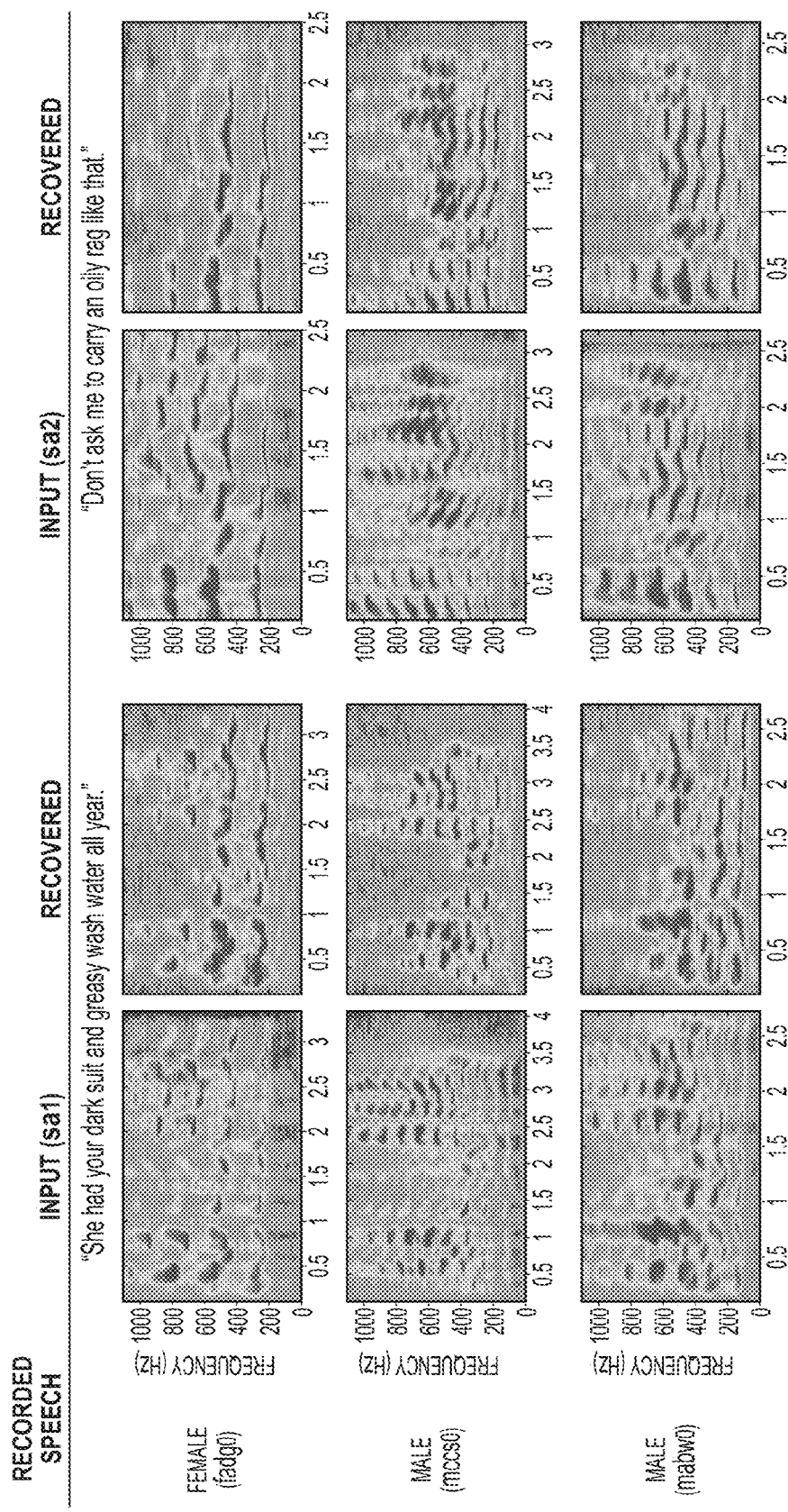
FIGS. 11A-11B illustrate speech signals recovered from a video of a bag of chips.
Figure 11B:
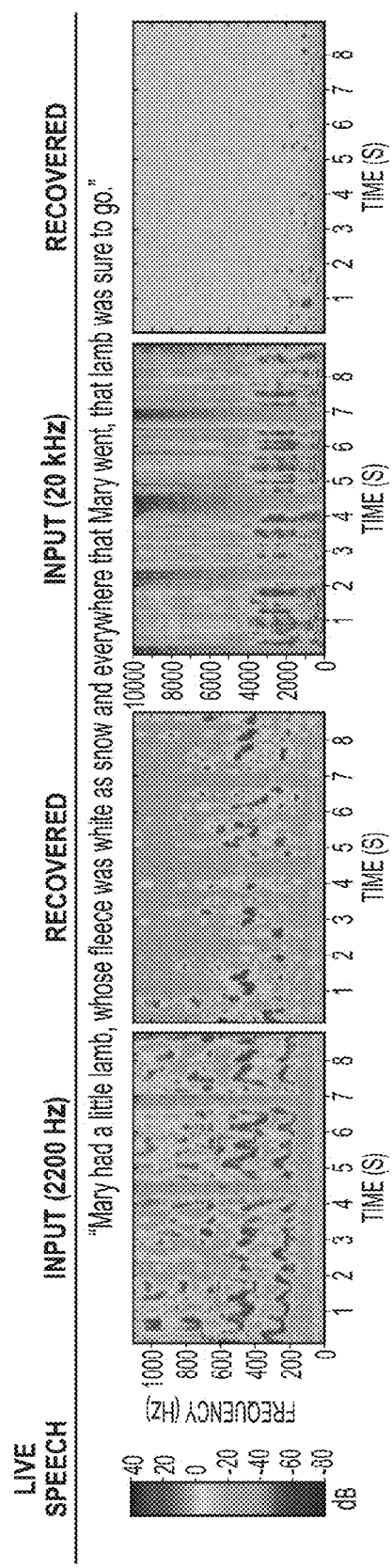

FIGS. 11A-11B illustrate speech signals recovered from a bag of chips. FIG. 11A shows recorded speech. Recordings were played of three speakers saying two different sentences from the TIMIT dataset through a loudspeaker near a bag of chips. Audio was then recovered from a 2, 200 Hz, 700×700 video of the bag of chips (see FIG. 10A for a representative frame). The spectrograms of both the input audio and the recovered signal are displayed in FIG. 11A. FIG. 11B illustrates live speech. In a separate experiment, a male speaker recited the nursery rhyme "Mary had a little lamb . . . ," near the same bag of chips. Spectrograms of the audio recorded by a conventional microphone are displayed next to the spectrograms of the audio recovered from video of the bag of chips using a visual microscope method. Results were recovered from videos taken at 2, 200 Hz, 700×700 pixels (left side of FIG. 11A), and 20 kHz, 192× 192 pixels (right side of FIG. 11A).

Analysis

Analysis can help predict when and how well visual microphones work, and the scale of motions that can be recovered can also be estimated. At a high level, visual microphone methods infer some input sound s(t) by observing the motion it causes in a nearby object. FIG. 6 outlines a series of transformations describing this process. A sound, s(t), defined by fluctuations in air pressure over time, acts on the surface of an object. The object then moves in response to this sound, transforming air pressure into surface displacement. This is referred to as transformation the object response (FIG. 6A). The resulting pattern of surface displacement is then recorded with a camera, and, using visual microphone methods (FIG. 6B), transforms the recorded video into a recovered sound. Intuitively, the ability to recover s(t) will depend on the object response and processing transformations illustrated in FIGS. 6A-1 and 6A-2. These transformations are characterized herein to help predict how well the visual microphone will work in new situations.

Object Response

In this subsection, the object response referred to in FIG. 6A-1 is further characterized. For each object, motion was recorded in response to two sound signals in a calibrated lab setting. The first signal was a 300 Hz pure tone that increased linearly in volume from [0.1-1] Pascal (RMS) (~57 to 95 decibels). This signal was used to characterize the relationship between volume and object motion. To get an accurate measure of volume, the experimental setup (the loudspeaker, room, and position of the object being tested) was calibrated using a decibel meter.

FIGS. 12A-12C illustrate object motion as function of sound volume and frequency, as measured with a laser Doppler vibrometer. The objects measured are shown at the top of FIG. 12, ordered according to their peak displacement at 95 dB, from left (larger motion) to right (smaller motion). FIG. 12B shows the RMS displacement (micrometers) versus RMS sound pressure (Pascals) for the objects being hit by a calibrated 300 Hz sine wave linearly increasing in volume from 57 decibels to 95 decibels. Displacements are approximately linear in Pascals, and are all in the order of a micrometer (one thousandth of a millimeter). For each object, one or more additional frequencies were tested, and this relationship remained linear, suggesting that the object response can be modelled as a linear time invariant (LTI) system. FIG. 12C shows the frequency responses of these objects (power dB versus frequency), based on their response to a ramp of frequencies ranging from 20 Hz to 2200 Hz. Higher frequencies tend to have weaker responses than lower frequencies. Frequency responses are plotted on a dB scale, so the relative attenuation of higher frequencies is quite significant.

The second test signal was a ramp signal similar to the one illustrated in FIG. 8A, with frequencies in the range of 20 Hz to 2200 Hz. Modeling object response as an LTI system, this ramp signal was used to recover the impulse response of that system. This was done by deconvolving the observed ramp signal (this time recorded by a LDV) by the known input using Wiener deconvolution.

FIG. 12C shows frequency responses derived from the recovered impulse responses. The frequency responses shown in FIG. 12C have been smoothed to remove noise and intelligibly display all ten on one graph. Responses may also be affected by the responses of the room and speaker. FIG. 12C shows that most objects have a stronger response at lower frequencies than higher frequencies (as expected), but that this trend is not monotonic. This observation is consistent with the observations made in the previous subsection herein entitled Sound Recovery from Different Objects/Materials.

The object response transformation A can then be expressed in the frequency domain as a multiplication of the sound spectrum, $S(\omega)$, by the transfer function $A(\omega)$, yielding the spectrum of the motion, $D_{mm}(\omega)$:

$$D_{mm}(\omega) \approx A(\omega) S(\omega). \quad (6)$$

The magnitude of the coefficient $A(\omega)$ for an object corresponds to the slope of its respective volume versus displacement curve (like the curves shown in FIG. 12B) at frequency co.

Processing

The relationship between object motion $D_{mm}$ and pixel displacement, $D_p$, is a straightforward one given by the projection and sampling of a camera. Camera parameters like distance, zoom, viewing angle, etc., affect the method's input (the video) by changing the number of pixels that capture an object, $n_p$, the magnification of pixel motion (in mm/pixel), m, and the noise of captured images, $\sigma_N$. The relationship between object motion and pixel motion can be expressed as:

$$D_p(\omega) = D_{mm}(\omega) \times m \times \cos(\theta), \quad (7)$$

where $\theta$ is the viewing angle of the camera relative to the object's surface motion and m is the magnification of the surface in mm/pixel.

Through simulations, the effect of the number of pixels imaging an object ($n_p$), the amplitude (in pixels) of motion ($D_p(w)$), and image noise (given by standard deviation $\sigma_N$) on the SNR of the recovered sounds was also studied. The results of these simulations confirmed the following relationship:

$$\frac{\sigma_S(\omega)}{\sigma_N(\omega)} \propto |D_p(\omega)| \frac{\sqrt{n_p}}{\sigma_n}, \quad (8)$$

which shows how the signal to noise ratio (SNR) increases with motion amplitude and the number of pixels and how the SNR decreases with image noise.

To confirm this relationship between SNR and motion amplitude with real data and to test the limits of the method on different objects, another calibrated experiment like the one previously described in the Object Response subsection was conducted. This time, the experiment was conducted using the visual microphone instead of a laser vibrometer. In this experiment, the camera was placed about 2 meters away from the object being recorded, and objects were imaged at 400×480 pixels with a magnification of 17.8 pixels per millimeter. With this setup, SNR (dB) was evaluated as a function of volume (standard decibels).

Figures 13A, 13B:
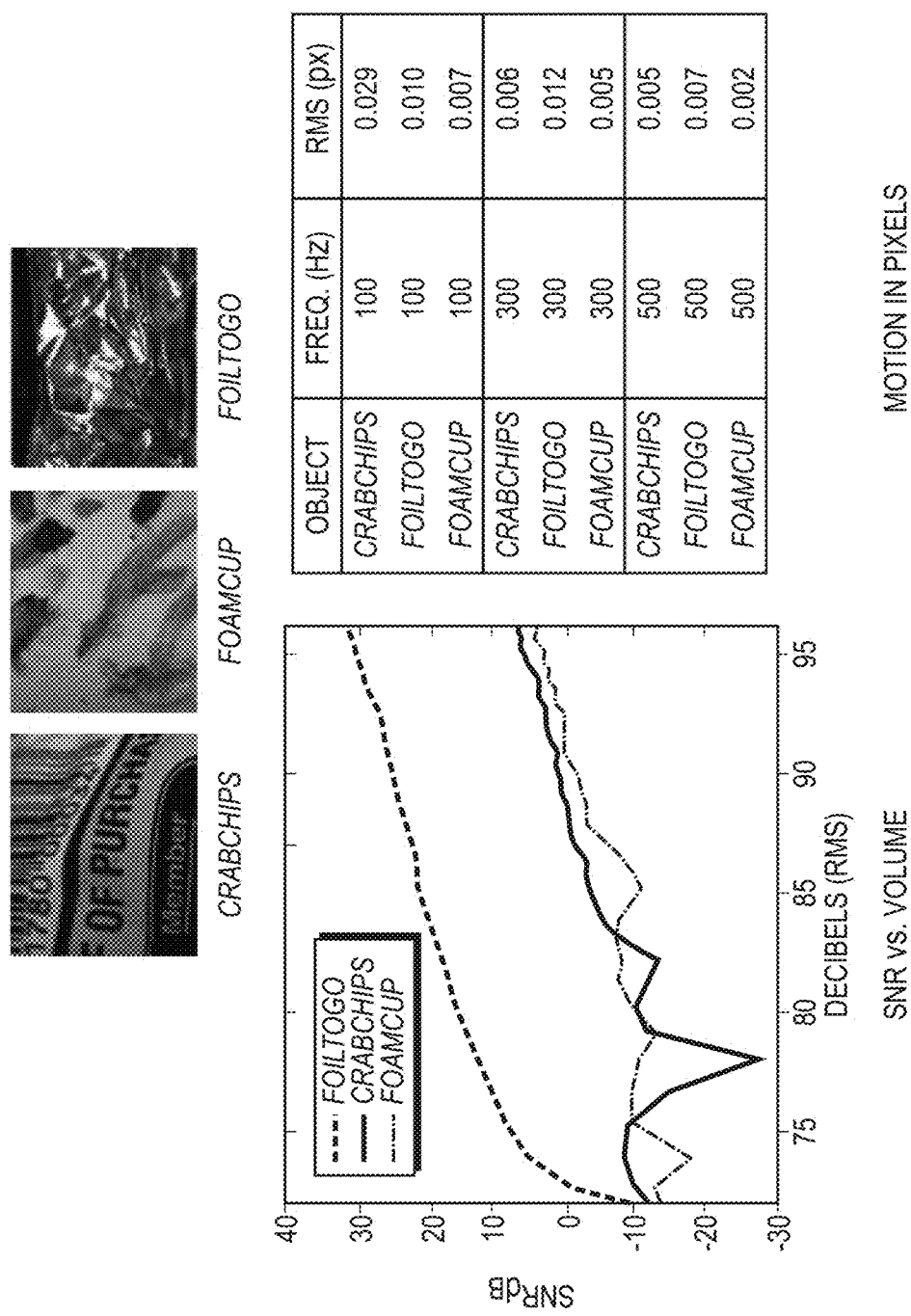
FIG. 13A is a graph showing the signal-to-noise ratio of sound recovered from video as a function of volume.
FIG. 13B is a table summarizing the absolute motion in pixels for several objects when a sine wave of varying frequency and volume is played at them.

FIG. 13A is a graph showing the signal-to-noise ratio of sound recovered from video as a function of volume. For sufficiently large amplitudes of pixel displacement, the recovered signal becomes approximately linear in volume, confirming the relationship given in Equation 8.

FIG. 13B is a table summarizing the absolute motion in pixels for several objects when a sine wave of varying frequency and volume is played at them. The motion, in pixels, for each of the corresponding videos was estimated using phase-based optical flow (Gautama, T., and Van Hulle, M., 2002, "A phase-based approach to the estimation of the optical flow field using spatial filtering," *Neural Networks, IEEE Transactions on* 13, 5 (September), 1127-1136) to give a sense of the size of motions in the videos. These motions were found to be on the order of one hundredth to one thousandth of a pixel, as shown in FIG. 13B.

Recovering Sound with Normal Video Cameras Using Rolling Shutter

Significantly, while high speed video can be used for the methods described herein, even standard frame rates can be used to recover sound. This section describes recovering audio from video filmed at regular frame rates by taking advantage of the rolling shutter common in the CMOS sensors of most cell phones and digital single-lens reflex (DSLR) cameras. With a rolling shutter, sensor pixels are exposed and read out row-by-row sequentially at different times from top to bottom. Compared to uniform global shutters, this design is less expensive to implement and has lower power consumption. In general, rolling shutters often produce undesirable skewing artifacts in recorded images, especially for photographs of moving objects. Previously, researchers have tried to mitigate the effect of rolling shutters on computer vision problems such as structure-from-motion and video stabilization. A rolling shutter has also been used to estimate the pose and velocity of rigid objects from a single image. This section describes how a rolling shutter can be used advantageously to effectively increase the sampling rate of a camera and recover sound frequencies higher than the camera's frame rate, the rate at which a series of images is captured by the camera.

Figure 14A:
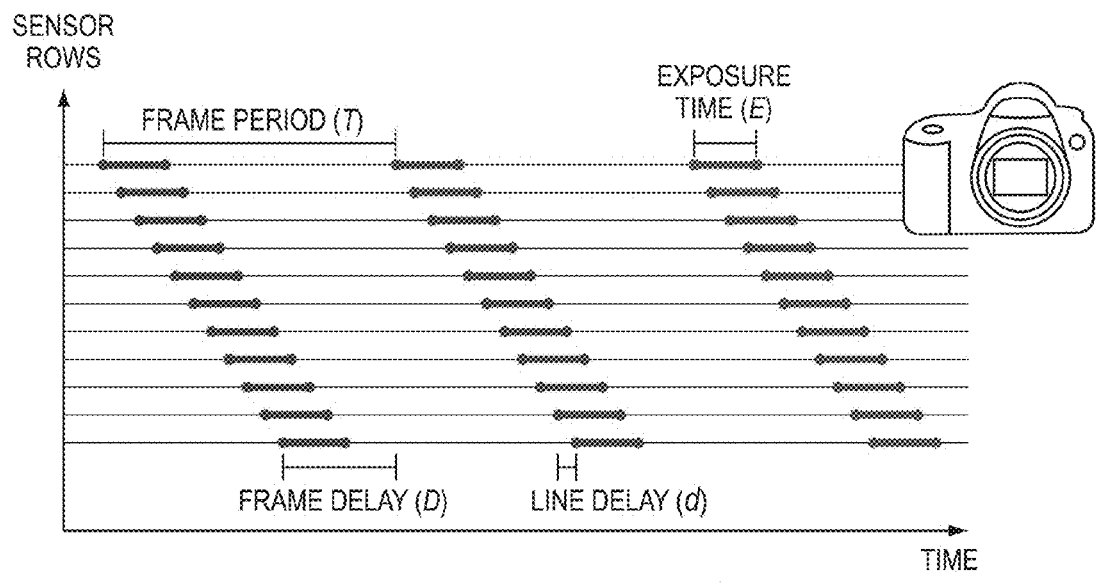
FIGS. 14A-14B illustrate how motions from a rolling shutter camera can be converted to an audio signal.
Figure 14B:
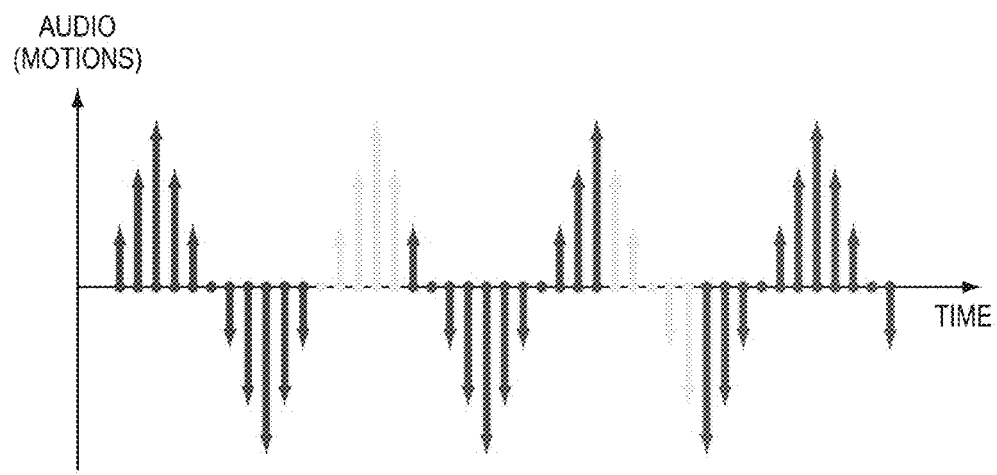

FIGS. 14A-14B illustrate how motions from a rolling shutter camera can be converted to an audio signal. Each row of the video is captured at a different time, as illustrated in FIG. 14A. The line delay d is the time between the capture of consecutive rows. The exposure time E is the amount of time the shutter is open for each row, the frame period is the time between the start of each frame's capture and the frame delay is the time between when the last row of a frame and the first row of the next frame are captured. The motion of each row corresponds to a sample in the recovered audio signal shown in FIG. 14B. Samples that occur during the frame delay period are missing and are denoted in light gray.

Because each row in a sensor with rolling sensor is captured at different times, an audio signal for each row can be recovered, rather than only for each frame, increasing the sampling rate from the frame rate of the camera to the rate at which rows are recorded. The mapping of the sensor rows to the audio signal can be fully determined by knowing the exposure time of the camera, E, the line delay, d, which is the time between row captures, the frame period T, the time between frame captures, and the frame delay, D (shown in FIG. 14A). The rolling shutter parameters can be taken from the camera and sensor specifications or computed (for any camera) through a simple calibration process (Meingast, M., Geyer, C., and Sastry, S., 2005, "Geometric models of rolling-shutter cameras," arXiv preprint cs/0503076).

A forward model can be assumed, in which an object, whose image is given by B(x, y), moves with coherent fronto-parallel horizontal motion described by s(t). It can also be assumed that the motion reflects the audio to be recovered, as before. If it is assumed that the exposure time E≈0, then the nth frame $I_n$ taken by the camera can be characterized by the equation $$I_n(x,y)=B(x-\alpha s(nT+yd),y). \quad (9)$$

Eqn. 9 can be used to produce a simulation of rolling shutter. If it is assumed that the yth row of B has sufficient horizontal texture, s(nT+yd) can be recovered using phase-based motion analysis. If the frame delay, the time between the capture of the last row of one frame and the first row of the next frame, is not zero, then there can be times when the camera is not recording anything. This results in missing samples or "gaps" in the audio signal. In FIG. 14B, we show how a triangular wave is recovered from a rolling shutter camera. Each frame contributes eleven samples, one for each row. There are five missing samples, denoted in light gray, between each frame corresponding to the non-negligible frame delay. To deal with the missing samples in the audio signal, an audio interpolation technique from Janssen (Janssen, A., Veldhuis, R., and Vries, L. 1986, "Adaptive interpolation of discrete-time signals that can be modeled as autoregressive processes," *Acoustics, Speech and Signal Processing, IEEE Transactions on* 34, 2, 317-330) was used.

In practice, the exposure time is not zero, and each row is the time average of its position during the exposure. For sinusoidal audio signals of frequency ω>1/E, the recorded row will approximately be to the left of its rest position for half of the exposure and to the right for the other half. Therefore, it will not be well-characterized by a single translation, suggesting that E is a limit on the maximum frequency that can be captured with a rolling shutter. Most cameras have minimum exposure times on the order of 0.1 milliseconds (10 kHz).

Figure 15B:
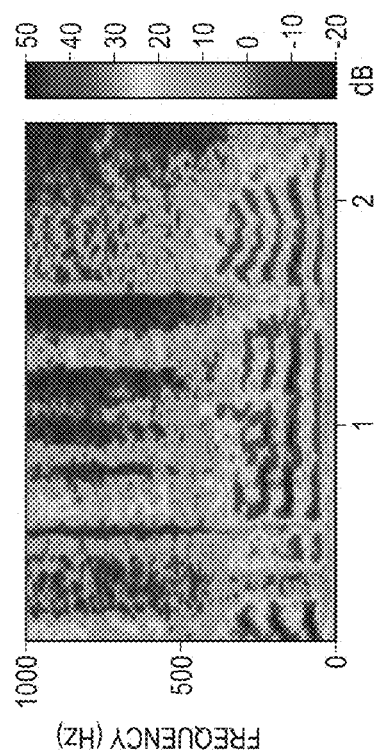
FIGS. 15A-15D illustrate a source frame and sound recovered from a normal frame-rate video obtained using a standard digital single-lens reflex (DSLR) camera with rolling shutter.
Figure 15D:
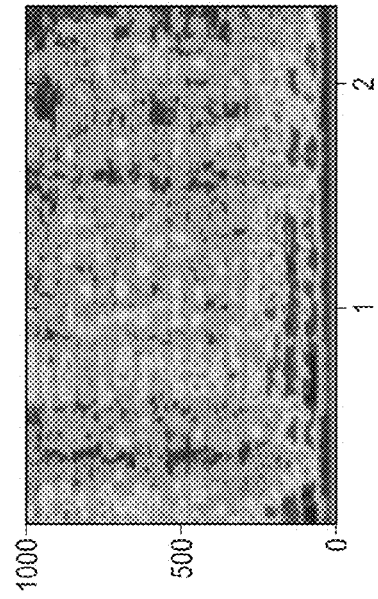
Figure 15A:
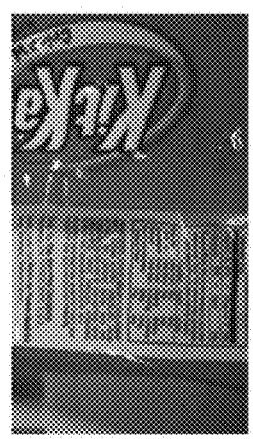
Figure 15C:
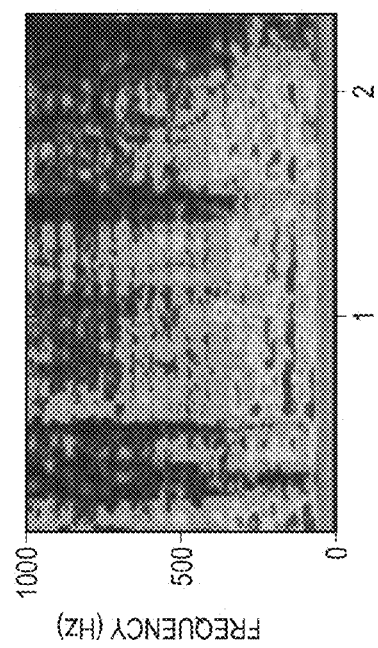

FIGS. 15A-15B illustrate a source frame and sound recovered from a normal frame-rate video obtained using a standard DSLR camera with rolling shutter. FIG. 15A shows a frame from the DSLR video. FIG. 15B shows a spectrogram of James Earl Jones's recitation of "The Raven" by Edgar Allan Poe as played through a loudspeaker, while an ordinary DSLR camera filmed a nearby candy bag. The candy bag was placed near a loudspeaker playing the speech, and the video was taken from a viewpoint orthogonal to the loudspeaker-object axis, so that the motions of the bag due to the loudspeaker would be horizontal and fronto-parallel in the camera's image plane. A Pentax K-01 with a 31 mm lens was used. The camera recorded at 60 FPS at a resolution of 1280×720 pixels with an exposure time of 1/2000 seconds. By measuring the slope of a line, it was determined to have a line delay of 16 microseconds and a frame delay of 5 milliseconds, so that the effective sampling rate was 61920 Hz with 30% of the samples missing. The exposure time caps the maximum recoverable frequency at around 2000 Hz. In addition to audio interpolation to recover missing samples, we also denoise the signal with a speech enhancement algorithm and a low-pass filter to remove out-of-range frequencies we cannot recover due to the exposure time.

FIG. 15 D shows the spectrogram of the signal recovered from the DSLR. FIG. 15C shows the result from a rolling shutter simulation that used camera parameters identical to those of the DSLR, except that exposure time (E) that was set to zero.

Discussion

Information from Unintelligible Sound

Many of the examples given herein focus on the intelligibility of recovered sounds. However, there are situations where unintelligible sound can still be informative. For instance, identifying the number and gender of speakers in a room can be useful in some surveillance scenarios, even if intelligible speech cannot be recovered. Some experiments using methods described herein showed that even wherein lyrics of a song were unintelligible in a recovered sound, music could still be recovered well enough for some listeners to recognize the song.

Figure 16B:
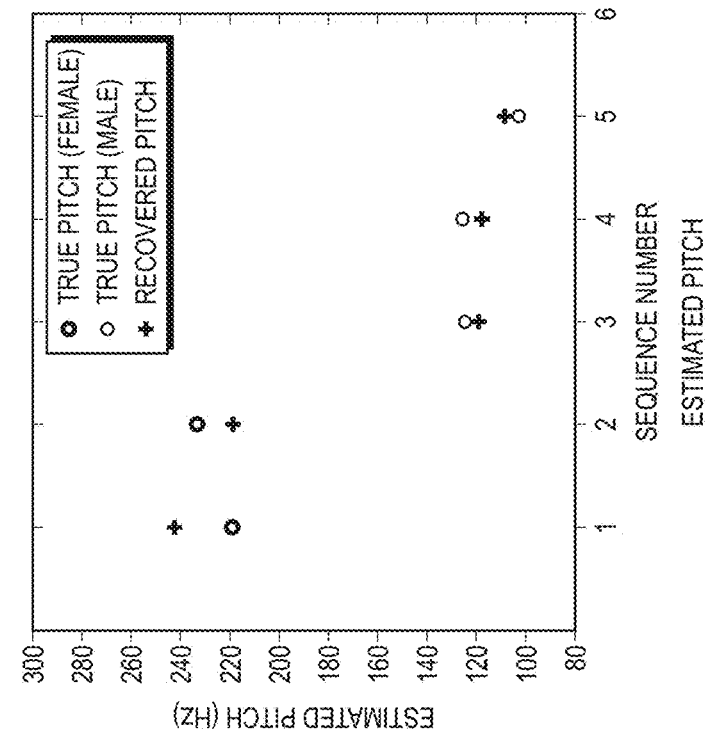
FIGS. 16A-16B illustrate the results of an experiment in which the gender of speakers was successfully detected from unintelligible speech.
Figure 16A:
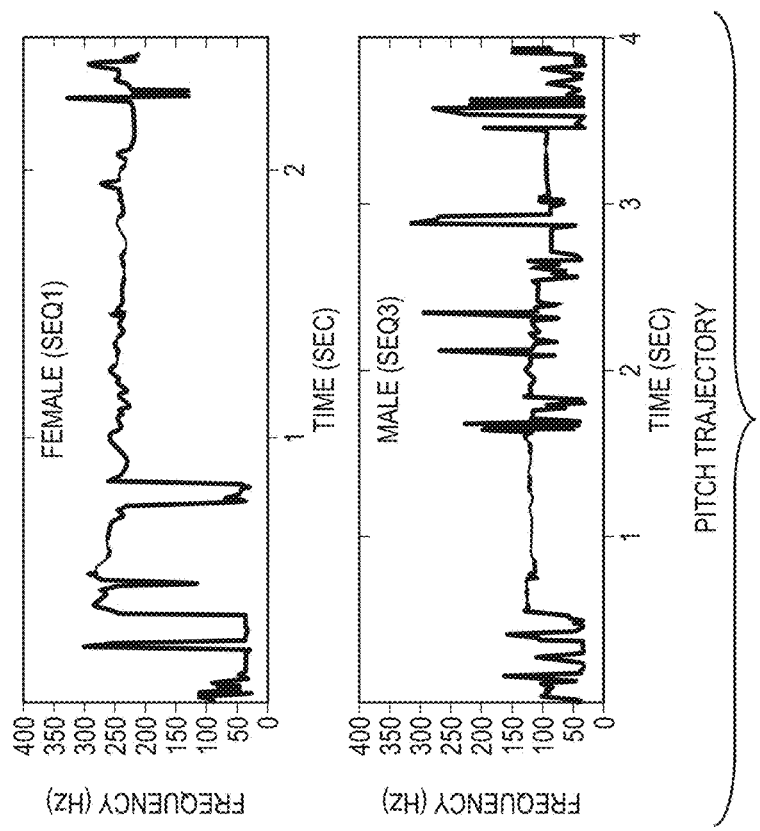

FIGS. 16A-16B illustrate that visual microscope methods can be useful even when recovered speech is unintelligible. FIG. 16A shows the estimated pitch trajectory for two recovered speech samples (female above, male below). Blue segments indicate high confidence in the estimation. The gender of speakers was successfully detected from unintelligible speech, in part using a standard pitch estimator (De Cheveign'e, A., and Kawahara, H. 2002. "Yin, a fundamental frequency estimator for speech and music," *The Journal of the Acoustical Society of America* 111, 4, 1917-1930). In this example, five TIMIT speech samples were used, recovered from a tissue box and a foil container. The recovered speech was difficult to understand, but using a standard pitch estimator, the pitch of the speaker's voice was recovered (FIG. 16B).

Visualizing Vibration Modes

Because methods described herein recover sound from a video, a spatial measurement of the audio signal can be obtained at many points on the filmed object or surface, rather than only at a single point like a laser microphone. Representations of local motions of a surface can be compared, instead of combined, to make a determination of which local motions are in-phase or out-of-phase with each other. This spatial measurement can be used to recover the vibration modes of an object. This can be a powerful tool for structural analysis, where general deformations of an object are often expressed as superpositions of the object's vibration modes. As with sound recovery from surface vibrations, most existing techniques for recovering mode shapes are active. For instance, one known technique scans a laser vibrometer in a raster pattern across a surface. Alternatively, holographic interferometry works by first recording a hologram of an object at rest, then projecting this hologram back onto the object so that surface deformations result in predictable interference patterns.

Vibration modes are characterized by motion where all parts of an object vibrate with the same temporal frequency, the modal frequency, with a fixed phase relation between different parts of the object. The modal frequencies can be found by looking for peaks in the spectra of the local motion signals. At one of these peaks, there is a Fourier coefficient for every spatial location in the image. These Fourier coefficients give the vibration mode shape with amplitude corresponding to the amount of motion, and they give phase corresponding to fixed phase relation between points.

FIGS. 17A-C show experimental and theoretical results of vibration mode analysis using video of a drum head, a circular latex membrane excited by a chirp played from a nearby audio source. An input video frame of the drum head is shown in FIG. 17A. FIG. 17B shows vibration mode shapes recovered using a visual microscope method, while FIG. 17C shows corresponding theoretically derived mode shapes. For the modes shown in FIG. 17B, the phase of surface motion across the membrane is mapped to hue, while the amplitude of vibrations across the surface is mapped to saturation and brightness. The recovered vibration modes (FIG. 17B) closely correspond to the theoretically derived modal shapes (FIG. 17C).

Zoom Lenses and Applications

The degree of effectiveness of video microphone methods can be related to both sampling rate and the magnification of the lens of the camera. The SNR of audio recovered by methods described herein is proportional to the motion amplitude in pixels and to the number of pixels that cover the object (Eqn. 8), both of which increase as the magnification increases and decrease with object distance. As a result, to recover intelligible sound from far away objects, a powerful zoom lens can be helpful. The experiment illustrated in FIG. 5 used a 400 mm lens to recover sound from a distance of 3-4 meters. Recovery from much larger distances may require more expensive optics with larger focal lengths.

Figure 18C:
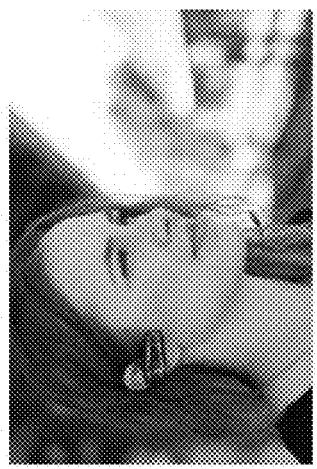
FIGS. 18A-E illustrates several potential applications for embodiment methods and apparatus.
Figure 18B:
Figure 18A:
Figure 18E:
Figure 18D:

FIGS. 18A-E illustrates several potential applications for embodiment methods and apparatus. One application includes eavesdropping for military/surveillance/espionage purposes. FIG. 18A depicts such a scenario, where by analyzing the tiny vibrations caused by a person's voice in objects in a room (e.g. a window, a table, a plant or a glass of water on the table), the speech of the person could be detected. Disclosed methods could also be used to know what people are listening to through their wired (FIG. 18B) or wireless (FIG. 18C) headsets. Bluetooth headsets are commonly used nowadays for communication. While Bluetooth is a wireless standard with high level of security that is hard to break, it may be possible to visually detect the vibrations in the headsets caused by the speakers inside them to listen to a private conversation.

There are other, less government-related potential applications as well. For example, visual analysis of vibrations in a video of a person's neck (and the person's corresponding sound) (FIG. 18D) may be used to non-invasively detect voice problems such as changes in pitch or loss of voice, which are currently examined through video endoscopy (inserting a camera through the patient's mouth or nose to visually inspect the vocal folds). A video of a recording studio (FIG. 18E) may be used to analyze its acoustic properties and feedback. Moreover, the methods may be useful for dubbing synchronization. During dubbing, an actor can re-record lines spoken during filming to change language or improve recording quality. Detecting the sounds in the scene visually could facilitate synchronization of the video with the re-recorded audio. It is also possible that, with a high speed video input of, for example, people talking in a crowded room, observations about how vibrations vary spatially in the video could be used to decompose the audio signal into distinct sources. Further, it is possible that a surface from a video could be selected, the audio signal could be re-weighted so that it represents a recording from the corresponding selected surface.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims. For example, a non-transient computer-readable medium can contain code that, when executed, causes combining of representations of local motions of a surface to produce a global motion signal of the surface, the local motions being captured in a series of images of features of the surface, and the global motion signal representing a sound within an environment in which the surface is located.

What is claimed is:

1. A method of recovering audio signals, the method comprising:

deriving representations of local motions of different portions of a surface from a series of optical images of features of the different portions of the surface, the series of optical images having been captured with the surface in a presence of a sound, and deriving the representations of local motions including decomposing each image of the series of optical images into multiple dimensions using a complex steerable pyramid structure;

combining the representations of local motions of different portions of the surface to produce a global motion signal of the surface; and producing an audio signal of the sound based on the global motion signal of the surface having been located in the presence of the sound.

2. The method of claim 1, wherein combining the representations includes combining the representations of the local motions over rows or batches of rows of pixels in at least a subset of the images.

3. The method of claim 1, wherein combining the representations includes combining the representations over one or more entire images of the series of images.

4. The method of claim 1, wherein combining the representations includes combining the representations over a segmented region or unmasked region of the series of images.

5. The method of claim 1, further comprising filtering frequencies in the global motion signal to recover an improved-audibility audio signal of the sound.

6. The method of claim 1, further comprising removing noise from the global motion signal.

7. The method of claim 1, wherein combining the representations of local motions to produce the global motion signal of the surface includes using a transfer function to produce the global motion signal of the surface, the transfer function representing the global motion signal as a function of arbitrary incident sounds within an environment in which the surface is located.

8. The method of claim 7, further including imparting a known sound to the environment in which the surface is located to calculate the transfer function.

9. The method of claim 1, further comprising capturing the series of images using an imaging subsystem viewing the surface through an optically transparent sound barrier.

10. The method of claim 1, wherein combining the representations of the local motions includes aligning scale and orientation for each pixel in each image, the method further comprising aligning pixels temporally across a plurality of images in the series of images.

11. The method of claim 1, wherein combining the representations of local motions includes calculating, by a processor, an average or weighted average of the representations.

12. The method of claim 1, wherein combining the representations of local motions of the surface includes combining the representations over a region of one or more of the images corresponding to a region of the surface smaller in size than a wavelength of the sound causing a motion of the surface.

13. The method of claim 1, wherein the surface substantially fills an entirety of pixels of the series of images.

14. The method of claim 1, wherein combining the representations of the local motions includes combining the representations with an effective sampling frequency greater than a frame rate with which the series of images is captured.

15. An audio signal recovery apparatus comprising:

memory configured to store representations of local motions of different portions of a surface, the local motions having been captured in a series of optical images of features of the different portions of the surface with the surface located in a presence of a sound; and a processor configured to derive the representations of local motions by decomposing each image of the series of optical images into multiple dimensions using a complex steerable pyramid structure, the processor further configured to combine the representations of local motions of the surface to produce a global motion signal of the surface, the processor further configured to produce an audio signal of the sound based on the global motion signal of the surface having been located in the presence of the sound.

16. The apparatus of claim 15, wherein the processor is further configured to combine the representations of the local motions over rows or batches of rows of pixels in at least a subset of the images.

17. The apparatus of claim 15, wherein the processor is further configured to combine the representations over one or more entire images of the series of images.

18. The apparatus of claim 15, wherein the processor is further configured to combine the representations over a segmented region or unmasked region of one or more images of the series of images.

19. The apparatus of claim 15, wherein the processor is further configured to filter frequencies in the global motion signal to recover an improved-audibility audio signal of the sound.

20. The apparatus of claim 15, wherein the processor is further configured to remove noise from the global motion signal.

21. The apparatus of claim 15, wherein the processor is further configured to use a transfer function to produce the global motion signal of the surface, the transfer function representing the global motion signal as a function of arbitrary incident sounds within the environment in which the surface is located.

22. The apparatus of claim 21, further comprising a sound transducer configured to impart a known sound to the environment in which the surface is located to calculate the transfer function.

23. The apparatus of claim 15, further comprising an imaging subsystem configured to capture the images of the surface through an optically transparent sound barrier.

24. The apparatus of claim 15, wherein the processor is further configured to align scale and orientation for each pixel in each image and to align pixels temporally across a plurality of images in the series of images.

25. The apparatus of claim 15, wherein the processor is further configured to produce an average or weighted average of the representations of local motions of the surface.

26. The apparatus of claim 15, wherein the processor is configured to combine the representations over a region of one or more of the images corresponding to a region of the surface smaller in size than a wavelength of the sound causing a motion of the surface.

27. The apparatus of claim 15, wherein the surface substantially fills an entirety of pixels of the series of images.

28. The apparatus of claim 15, wherein the processor is further configured to combine the representations with an effective sampling frequency greater than a frame rate with which the series of images is captured.

29. A method comprising:
deriving representations of local motions of different portions of a surface from a series of optical images of features of the different portions of the surface, the series of optical images having been captured with the surface in a presence of a sound, and deriving the representations of local motions including decomposing each image of the series of optical images into multiple dimensions using a complex steerable pyramid structure;
comparing the representations of local motions of different portions of the surface to make a determination of which local motions are in-phase or out-of-phase with each other; and
recovering one or more vibration mode shapes of the surface based on the determination of which local motions are in-phase or out-of-phase with each other.

30. The method of claim 1, wherein combining the representations of local motions captured in the series of optical images includes using a series of at least one of infrared or visible images.

31. The method of claim 1, wherein combining the representations of local motions includes using representations of local motions of the surface corresponding to sub-pixel displacements in the series of optical images.

32. The method of claim 31, wherein combining the representations of local motions further includes using representations of local motions of the surface corresponding to displacements on the order of one hundredth or one thousandth of a pixel in the series of optical images.

33. The method of claim 1, wherein combining the representations of local motions includes combining local phase variations of the representations of local motions of different portions of the surface.

34. The method of claim 1, wherein combining the representations includes combining fluctuations in value of one or more pixels of the series of optical images over time.

35. The method of claim 1, wherein combining the representations includes combining representations of local motions having been captured in the series of optical images at a frame rate on the order of 2,000 frames per second (fps) or on the order of 20,000 fps.

36. The method of claim 1, wherein combining the representations includes combining representations of local motions having been captured in the series of optical images at a frame rate on the order of 30 fps or on the order of 60 fps.

37. The method of claim 1, wherein combining the representations includes combining representations of local motions having been captured in the series of optical images with a rolling-shutter camera.

38. The method of claim 1, wherein producing the audio signal includes producing a compressed audio signal.

39. The apparatus of claim 15, wherein the processor is further configured to produce the audio signal of the sound as a compressed audio signal.

* * * * *